US011992863B2

(12) United States Patent
Waymeyer

(10) Patent No.: US 11,992,863 B2
(45) Date of Patent: May 28, 2024

(54) AUTOMATED CLEANING FOR ICE MAKING UNIT

(71) Applicant: Haier US Appliance Solutions, Inc., Wilmington, DE (US)

(72) Inventor: Jordan Andrew Waymeyer, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 233 days.

(21) Appl. No.: 17/495,183

(22) Filed: Oct. 6, 2021

(65) Prior Publication Data

US 2023/0105394 A1 Apr. 6, 2023

(51) Int. Cl.

| | |
|---|---|
| ***B08B 3/08*** | (2006.01) |
| ***B08B 9/08*** | (2006.01) |
| ***B08B 13/00*** | (2006.01) |
| ***F25C 1/04*** | (2018.01) |

(52) U.S. Cl.

CPC .................. *B08B 3/08* (2013.01); *B08B 9/08* (2013.01); *B08B 13/00* (2013.01); *F25C 1/04* (2013.01); *B08B 2209/08* (2013.01); *F25C 2400/12* (2013.01); *F25C 2600/04* (2013.01)

(58) Field of Classification Search

CPC .. B08B 3/08; B08B 9/08; B08B 13/00; B08B 2209/08; B08B 9/027; F25C 1/04; F25C 2400/12; F25C 2600/04

USPC ........................................................... 62/347

See application file for complete search history.

(56) References Cited

U.S. PATENT DOCUMENTS 3,377,815 A * 4/1968 Soderberg ................ A23G 9/30 62/233
3,638,448 A * 2/1972 Raymer .................... F25C 1/00 222/149
3,911,691 A * 10/1975 Kohl ....................... F25C 5/187 340/617

(Continued)

FOREIGN PATENT DOCUMENTS

CN 112246803 A 1/2021
EP 0683365 A1 * 11/1995

(Continued)

OTHER PUBLICATIONS

JP-2001184561-A, machine translation (Year: 2023).*
JP 2005274020A, machine translation (Year: 2023).*

*Primary Examiner* — Eric S Ruppert
*Assistant Examiner* — Kirstin U Oswald
(74) *Attorney, Agent, or Firm* — Dority & Manning, P.A.

(57) ABSTRACT

A household appliance includes an outer casing, a water tank and an ice maker. The water tank may be attached to the outer casing. The ice maker is disposed within the outer casing. The ice maker is in fluid communication with the water tank. The household appliance may further include a pump disposed within the outer casing, at least one drain tube attached to the outer casing and a controller. The pump may be in fluid communication with the water tank and the ice maker to flow water from the water tank to the ice maker. The at least one drain tube may define an exit point, the exit point located vertically below the ice mater. The controller may initiate a cleaning cycle that includes pumping a volume of cleaning solution through the ice maker and directing the volume of cleaning solution through the at least one drain tube.

18 Claims, 9 Drawing Sheets

(56) References Cited

U.S. PATENT DOCUMENTS

| | | | | | |
|---|---|---|---|---|---|
| 4,848,381 | A * | 7/1989 | Livingston | B67D 1/07 141/90 |
| 5,289,691 | A * | 3/1994 | Schlosser | F25C 1/12 62/78 |
| 5,329,950 | A * | 7/1994 | Barinas | B67D 1/07 134/102.1 |
| 5,829,257 | A * | 11/1998 | Newman | F25C 5/10 62/73 |
| 6,311,501 | B1 | 11/2001 | Allison | |
| 6,324,863 | B1 * | 12/2001 | Henry | C02F 1/4674 62/347 |
| 6,334,328 | B1 * | 1/2002 | Brill | A23G 9/325 62/347 |
| 6,619,051 | B1 * | 9/2003 | Kilawee | A61L 2/24 62/348 |
| 9,056,337 | B2 * | 6/2015 | Walker | A23G 9/30 |
| 10,174,984 | B2 * | 1/2019 | Vorosmarti, III | F25C 5/182 |
| 10,317,122 | B2 | 6/2019 | Broadbent | |
| 2004/0187947 | A1 * | 9/2004 | Heo | F16L 11/122 138/121 |
| 2007/0214809 | A1 * | 9/2007 | DiLorenzo | F25C 1/18 62/340 |
| 2009/0192231 | A1 * | 7/2009 | Lemons | A01N 37/36 514/738 |
| 2011/0041542 | A1 * | 2/2011 | Brunner | F25C 5/142 62/498 |
| 2012/0198870 | A1 * | 8/2012 | Erbs | F25C 1/12 62/347 |

FOREIGN PATENT DOCUMENTS

| | | | | |
|---|---|---|---|---|
| JP | 2001184561 | A * | 7/2001 | |
| JP | 2005274020 | A * | 10/2005 | |
| WO | WO-2009059405 | A1 * | 5/2009 | A23G 9/045 |
| WO | WO-2010110796 | A1 * | 9/2010 | A47L 11/283 |
| WO | WO2014117112 | A2 | 7/2014 | |

* cited by examiner

AUTOMATED CLEANING FOR ICE MAKING UNIT

FIELD OF THE INVENTION

The subject matter of the present disclosure relates generally to ice making appliances, and more specifically to features and methods for cleaning a portion of an ice making appliance.

BACKGROUND OF THE INVENTION

Ice making units generally produce ice for the use of consumers. Ice making units are found as stand-alone units, which often have their own refillable tank water supply, and in refrigerator appliances, which often have a water line connected to a household water supply. Ice making units may also be found in commercial settings, both as stand-alone units, and as systems integrated into water supply lines. While some ice making units in commercial settings are connected to or placed over drainage plumbing lines, other industrial ice making units and many residential units, both stand-alone and in-refrigerator ice making units, are not connected to drain plumbing systems, and must be drained manually.

Some form of cleaning is a common requirement for ice making units in general. Cleaning, for instance, extends the life of an ice making unit, as scale and deposits may build up over time, causing the ice making unit to make ice at a less desirable level or quality. Ice making units that are not routinely cleaned may need more frequent repairs or may require remedial cleaning, leaving the ice making unit unavailable for making ice for an extended period of time.

Manual cleaning of ice making units (i.e., a cleaning process therefor) can be an involved process that commonly involves numerous cycles of draining and refilling the unit. In some instances, an ice making unit cleaning process often involves taking apart the ice making unit's parts, cleaning each one, and replacing them. Parts may be difficult to reach, or finicky to separate. Separately from or in addition to disassembly, cleaning may involve placing cleaning fluid into a water tank in an ice making unit, cycling the cleaning fluid through the ice making unit, emptying the unit, and then refilling the ice making unit with fresh water, cycling the fresh water through the unit (e.g., multiple times), and draining the fresh water. Some units with small water tanks may need multiple refills of fresh water in order to complete their cleaning. Such a process is heavily user involved, both in time and effort. Cleaning efforts may take several hours and manual scrubbing to complete. Such effort decreases the likelihood of a user properly performing routine cleaning on an ice making unit.

It would therefore be useful to have an easier cleaning method for ice making units, especially for appliances not connected to residential or municipal plumbing networks. It would additionally or alternatively be beneficial to have an ice making unit or cleaning cycle that was more automated (i.e., requires less direct intervention or effort from a user) than is found existing ice making units.

BRIEF DESCRIPTION OF THE INVENTION

Additional aspects and advantages of the invention will be set forth in part in the following description, or may be apparent from the description, or may be learned through practice of the invention.

In one exemplary aspect of the present disclosure, a household appliance is provided. The household appliance may include an outer casing, a water tank, an ice maker, a pump, at least one drain tube, and a controller. The water tank may be attached to the outer casing. The ice maker may be disposed within the outer casing. The ice maker may be in fluid communication with the water tank. The pump may be disposed within the outer casing. The pump may be fluid communication with the water tank and the ice maker to flow water from the water tank to the ice maker. The at least one drain tube may be attached to the outer casing and may be in fluid communication with the water tank. Each drain tube may define an exit point. Each drain may have a cleaning position and a resting position. The exit point may be located vertically below the ice maker and the cleaning position. The controller may be inoperative communication with the pump and the ice maker. The controller may be configured to initiate a cleaning operation. The cleaning operation may include receiving a cleaning indication and initiating a cleaning cycle in response to receiving the cleaning indication. The cleaning cycle can include pumping a volume of cleaning solution through the ice maker and directing the volume of cleaning solution through the at least one drain tube.

In another exemplary aspect of the present disclosure, a method of cleaning a household appliance is provided. The method may include the steps of receiving a cleaning indication, initiating a cleaning cycle in response to receiving the cleaning indication, determining completion of the cleaning cycle, and directing a volume of cleaning solution through at least one drain tube. The cleaning cycle may include pumping a volume of cleaning solution through an ice maker. The step of directing the volume of cleaning solution through at least one drain tube may be completed by opening a drain valve in response to determining completion of the cleaning cycle. The drain valve may be in fluid communication with the at least one drain tube. The at least one drain tube may comprise a cleaning position for use during the cleaning cycle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Use of the same of similar reference numerals in the figures denotes the same or similar features unless the context indicates otherwise.

DETAILED DESCRIPTION OF THE INVENTION

Figure 1:
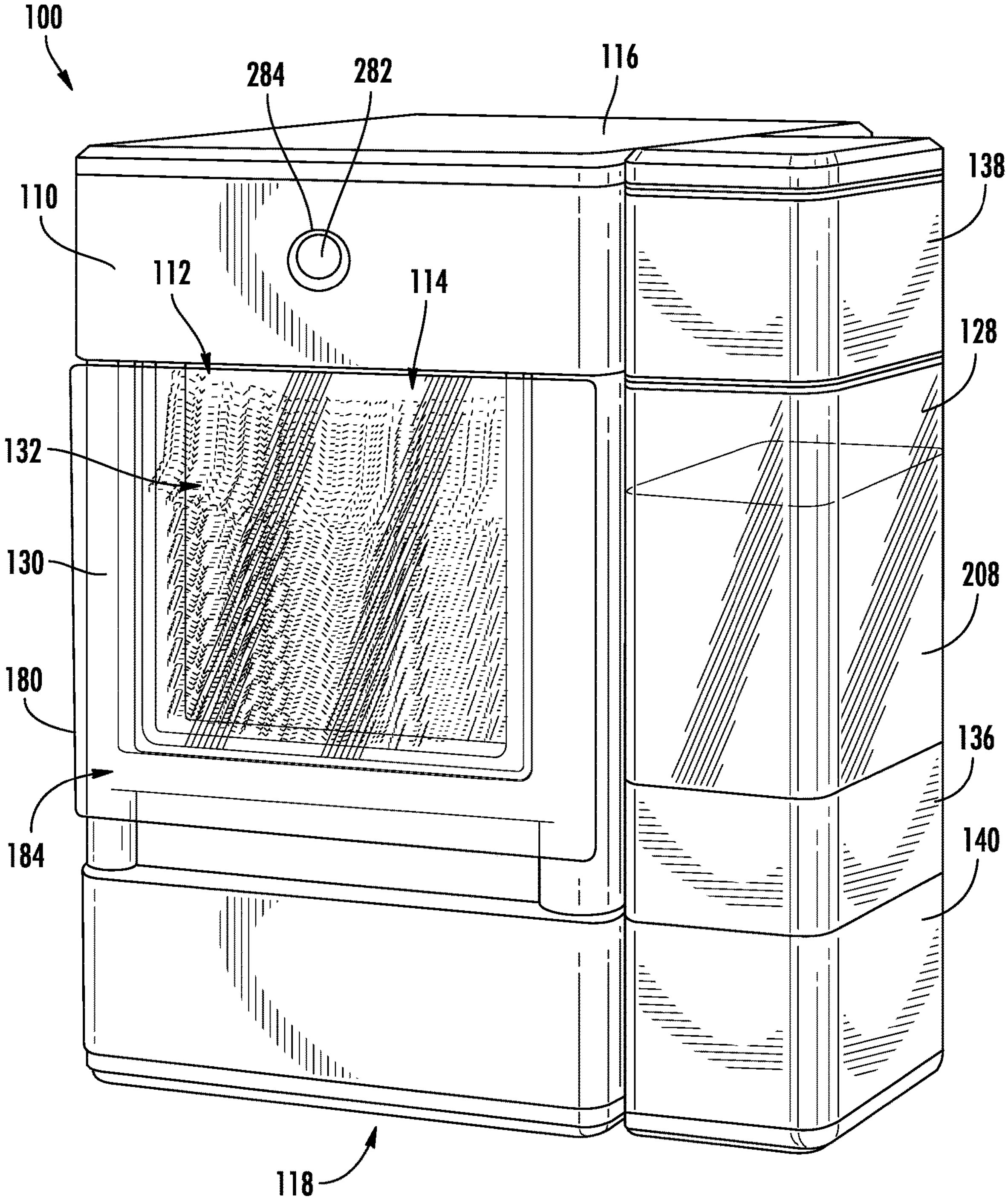
FIG. 1 provides a perspective view of a household appliance with an ice-making unit as described herein.
Figure 2:
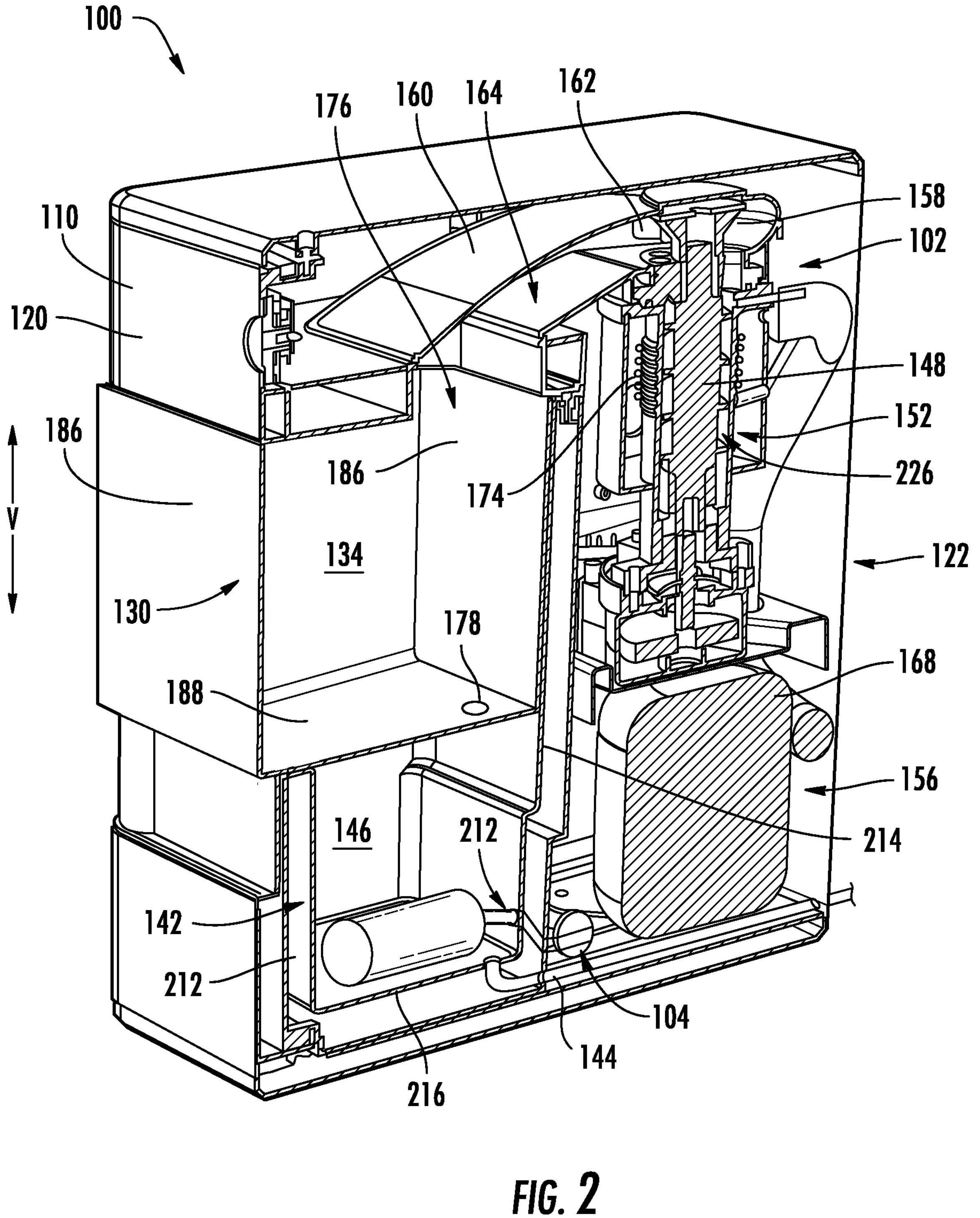
FIG. 2 provides a sectional, cutaway perspective view of the household appliance of FIG. 1.
Figure 3:
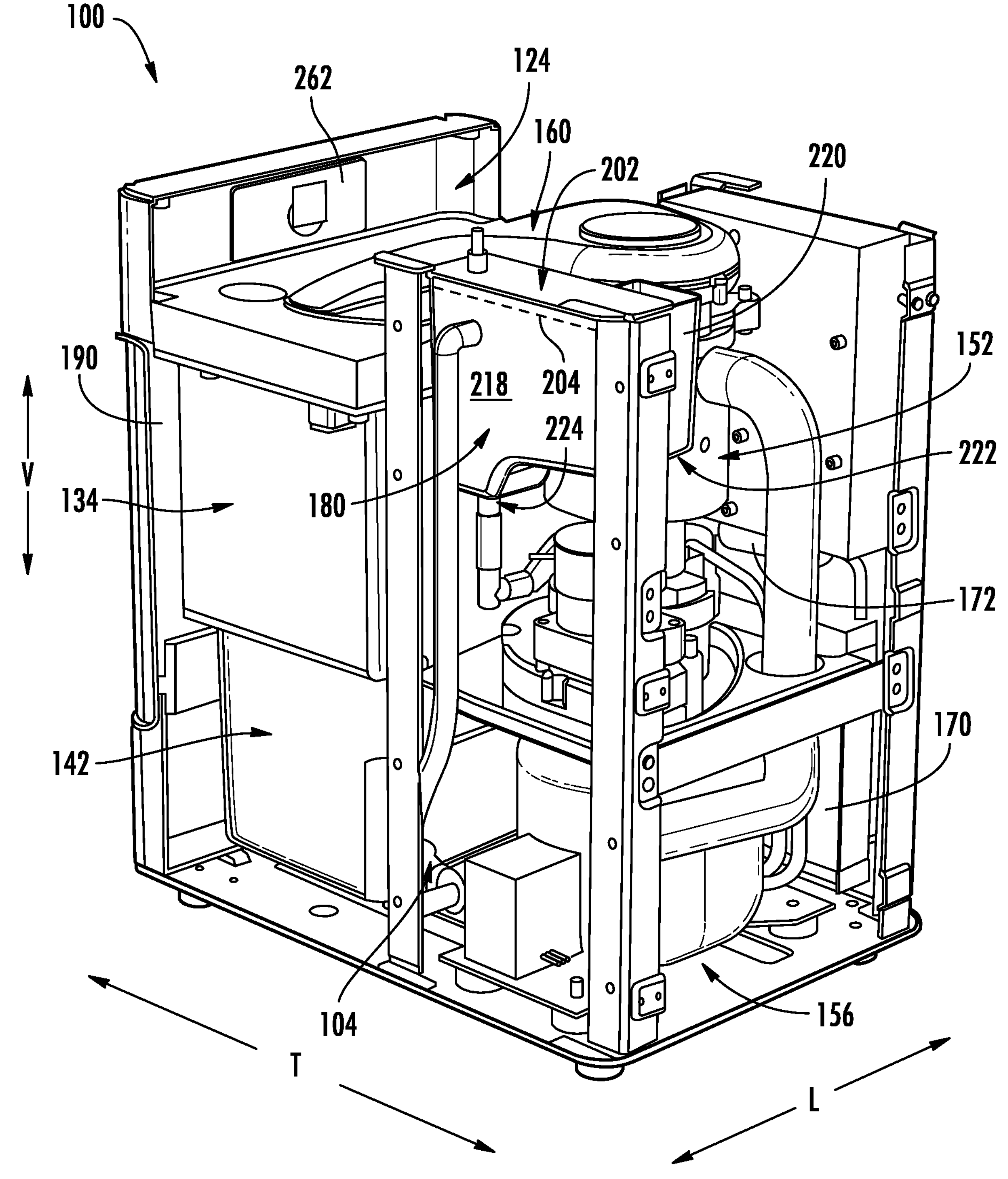
FIG. 3 provides a rear perspective view of the household appliance of FIG. 1.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms “includes” and “including” are intended to be inclusive in a manner similar to the term “comprising.” Similarly, the term “or” is generally intended to be inclusive (i.e., “A or B” is intended to mean “A or B or both”). As used herein, the term “attached” is intended to be inclusive to mean “connection” and includes concepts such as physically touching as well as housed within. Approximating language, as used herein throughout the specification and claims, is applied to modify any quantitative representation that could permissibly vary without resulting in a change in the basic function to which it is related. Accordingly, a value modified by a term or terms, such as “about,” “approximately,” and “substantially,” are not to be limited to the precise value specified. In at least some instances, the approximating language may correspond to the precision of an instrument for measuring the value. For example, the approximating language may refer to being within a ten percent (10%) margin.

A household appliance has an ice maker, a water source, a pump, a controller in operative communication with the ice maker and the pump, and a drain tube. The controller has a cleaning operation that receives a cleaning indication and directs the pump and ice maker to perform a cleaning cycle, cycling cleaning solution through the ice maker by the pump. The cleaning cycle automates much of the cleaning process and allows a user to readily maintain the household appliance.

Referring now to FIGS. 1 through 4, one embodiment of a household appliance 100 in accordance with the present disclosure is illustrated. As shown, household appliance 100 is provided as a stand-alone ice making appliance embodiment. Household appliance 100 includes an outer casing 110 which defines a primary opening (e.g., first primary opening 112) and an internal cavity or volume 114. Internal volume 114 generally at least partially houses various other components of the household appliance 100 therein. Primary opening defined in outer casing 110 extends internal volume 114 to an ambient environment. Through primary opening, access (e.g., by a user) to the internal volume 114 may be permitted. Outer casing 110 further defines a vertical direction V, a lateral direction L, and a transverse direction T. The vertical direction V, lateral direction L, and transverse direction T are mutually perpendicular and form an orthogonal direction system.

Household appliance is not limited to the embodiment shown in FIGS. 1 through 4, and may be provided as or include a stand-alone ice making unit; a stand-alone ice and beverage appliance; an in-unit refrigerator ice making unit within a refrigerator appliance, connected to a freshwater line, but having no connection to residential or municipal sewage networks; or an appliance with ice making unit with no drainage connection to residential or municipal plumbing networks, including freshwater lines. In certain examples, the household appliance has no external connections to residential or municipal plumbing networks, at both inlet and outlet.

Household appliance is generally sized and shaped to be supported on a conventional residential or commercial countertop (e.g., such that a user may place appliance on, and move appliance along, the countertop). Nonetheless, it is understood that appliance is provided as an exemplary embodiment and the present disclosure not limited to any particular size or shape, except as otherwise provided herein. Although household appliance is not limited to any specific shape or dimensions, household appliance may generally be sized to fit within a fairly small room, such as an office breakroom, commercial kitchen, or in place of a so-called water cooler (i.e., fountain). Reference will now be made to a stand-alone ice making unit, without limitation to other types of household appliances with ice making capabilities.

Notably, appliances as discussed herein include various features which allow the appliances to be affordable and desirable to typical consumers. For example, the stand-alone feature reduces the cost associated with the appliance and allows the consumer to position the appliance at any suitable desired location, with the only requirement in some embodiments being access to an electrical source.

As shown in FIGS. 1 through 5, household appliance 100 includes the outer casing 110 which has a top panel 116, bottom panel 118, opposing side panels 120, 122, a front panel 124, and a rear panel 126. The drain tube 106 is attached to the outer casing 110. A water tank 128 is attached to the outer casing 110. As shown in FIG. 1, the water tank 128 is disposed next to or on the outer casing 110. Water flows from the water tank 128 into the outer casing 110 (e.g., directly from water tank 128 through one or more conduits or indirectly from water tank 128, such as through one or more intermediate storage volumes). In some examples, water tank 128 is internal to the outer casing 110. Water flows to the pump 104 from the water tank 128. For instance, water may be motivated by a pump 104 in fluid communication with water tank 128. An ice maker 102 is disposed within the outer casing 110. The ice maker 102 is in fluid communication with the water tank 128. The ice maker 102 is also in fluid communication with the pump 104. The appliance 100 further includes an ice bin 130 located proximal to the ice maker 102. Formed ice 132 from ice maker 102 is provided by the ice maker 102 to the ice bin 130, which houses the ice 132 and is received in a bin volume 134 defined by the ice bin 130. The drain tube 106 is in fluid communication with the pump 104 as well, providing an exit point 228 for fluids (e.g., cleaning solution and rinse water, as will be described below). The drain tube 106 is attached with the outer casing 110, as will be described in more detail below.

As previously discussed, the water tank 128 is attached to outer casing 110, and further disposed outside of outer casing 110. For example, water tank 128 may be mounted at a side of outer casing 110. Thus, while most components of appliance 100 are housed within outer casing 110, water tank 128 may be positioned outside of outer casing 110. In certain example embodiments, water tank 128 includes a tank base 136 and a water container 138. Tank base 136 is attached to outer casing 110, e.g., at the side of outer casing 110 adjacent the bottom of outer casing 110. For instance, tank base 136 may be clipped, fastened, etc. to outer casing 110. Water container 138 is removably mounted to tank base 136. For example, a bottom portion 140 of water container 138 may be received within tank base 136 to mount water container 138 on tank base 136. A user may lift upwardly on water container 138 to remove water container 138 from tank base 136, and the user may insert bottom portion 140 of water container 138 into base to mount water container 138 on tank base 136. As an example, the user may remove water container 138 from tank base 136 in order to conveniently fill water container 138 with water at a faucet. Generally, water is provided to the water tank 128 for use in forming ice 132.

Water tank 128 is in fluid communication with an inner water tank 142 within outer casing 110 such that water within water tank 128 is flowable to the inner water tank 142. For example, a supply line 144 may extend from water tank 128 to a meltwater tank 142, and water from within water tank 128 flows from water tank 128 into meltwater storage volume 146 via supply line 144. It will be understood that appliance 100 may be plumbed in any other suitable manner to deliver water from water tank 128 into outer casing 110 for use with ice maker 102 in alternative example embodiments.

Ice maker 102 is provided downstream from the water tank 128 to receive water therefrom for ice making operations. Ice maker 102 may be provided as any suitable ice making assembly (e.g., for forming nugget ice, cubed ice, shaved ice, etc.). In certain embodiments, ice maker 102 includes or is provided as nugget ice maker, and in particular is an auger style ice maker. Nonetheless, other suitable styles of ice makers are within the scope of the present disclosure.

As shown, the appliance 100 includes an auger 148, an auger motor 150, and an auger casing 152. The auger 148 is disposed at least partially within an auger casing 152. During operation, the auger 148 rotates. An auger motor 150 is in operational communication with the auger 148, causing it to rotate. A motor sensor 154 further aids in determining the motion of the auger 148. The auger 148 is rotatably mounted within the auger casing 152 to push water through the auger casing 152. The auger casing 152 is in fluid communication with a water reservoir 180 and in thermal communication with the refrigeration system 156. Water within the auger casing 152 may at least partially freeze due to heat exchange, such as with a refrigeration system 156 as discussed herein. The at least partially frozen water may be lifted by the auger 148 from auger casing 152. Further, in exemplary embodiments, the at least partially frozen water may be directed by the auger 148 to and through an extruder 158. The extruder 158 may extrude the at least partially frozen water to form ice 132, such as nuggets of ice, as would be understood.

Formed ice 132 may be provided by the ice maker 102 to ice bin 130 and may be received in the bin volume 134 defined by ice bin 130. For example, ice 132 formed by the auger 148 or extruder 158 may be directed to the ice bin 130. In exemplary embodiments, a chute 160 may be included for directing ice 132 produced by the ice maker 102 towards the bin volume 134 defined by ice bin 130. For example, as shown, chute 160 is generally positioned above ice bin 130 along the vertical direction V. Thus, ice 132 can slide off of chute 160 and drop into ice bin 130. Chute 160 may, as shown, extend between ice maker 102 and ice bin 130, and may define a passage therethrough. Ice 132 may be directed from the ice maker 102 (such as from the auger 148 or extruder 158) through the passage of chute 164 to the ice bin 130. In some embodiments, for example, a sweep 162, which may for example be connected to and rotate with the auger 148, may contact the ice 132 emerging through the extruder 158 from the auger 148 and direct the ice 132 through the passage of chute 164 to the ice bin 130.

As discussed, water within the auger casing 152 may at least partially freeze due to heat exchange, such as with a refrigeration system 156. In exemplary embodiments, ice maker 102 may include a sealed refrigeration system 156. The sealed refrigeration system 156 may be in thermal communication with the auger casing 152 to remove heat from the auger casing 152 and the interior volume thereof, thus facilitating freezing of water therein to form ice 132. In some embodiments, a nugget engine thermistor 166 detects the temperature in the ice maker 102. The nugget engine thermistor 166 aids in facilitating the freezing of water in the auger casing 152. Sealed refrigeration system 156, for example, includes a compressor 168, a condenser 170, an expansion device 172, and an evaporator 174. Evaporator 174 may, for example, be in thermal communication with the auger casing 152 in order to remove heat from the auger casing 152 and water therein during operation of refrigeration system 156. For example, evaporator 174 may at least partially surround the auger casing 152. In particular, evaporator 174 may be a conduit coiled around and in contact with auger casing 152, such as the sidewall(s) thereof.

During operation of refrigeration system 156, refrigerant exits evaporator 174 as a fluid in the form of a superheated vapor or vapor mixture. Upon exiting evaporator 174, the refrigerant enters compressor 168 wherein the pressure and temperature of the refrigerant are increased such that the refrigerant becomes a superheated vapor. The superheated vapor from compressor 168 enters condenser 170 wherein energy is transferred therefrom and condenses into a saturated liquid or liquid vapor mixture. This fluid exits condenser 170 and travels through expansion device 172 that is configured for regulating a flow rate of refrigerant therethrough. Upon exiting expansion device 172, the pressure and temperature of the refrigerant drop at which time the refrigerant enters evaporator 174 and the cycle repeats itself. In certain exemplary embodiments, expansion device 172 may be a capillary tube or electronic expansion valve. Notably, in some embodiments, refrigeration system 156 may additionally include fans (not shown) for facilitating heat transfer to/from the condenser 170 or evaporator 174.

As noted above, ice 132 is received within the downstream ice bin 130. Ice bin 130 is located proximal to the ice maker 102 and configured to house ice 132 formed in the ice maker 102. For instance, ice bin 130 defines a bin opening 176 (e.g., at the top end of ice bin 130) to permit ice 132 therethrough. In some embodiments, a drain aperture 178 is defined at a bottom end of ice bin 130. For instance, drain aperture 178 is defined through a bin base wall 188 of ice bin 130 above discrete meltwater storage volume 146 housed in the meltwater tank 142. Ice 132 held within ice bin 130 may gradually melt. Drain aperture 178, advantageously drains meltwater away from ice bin 130. In some embodiments, one or more conduits extend from the meltwater tank 142 to the ice maker 102 or water tank 128. Thus, the meltwater may be reused by free-standing appliance 100 to form ice 132. The meltwater drain is also thus in fluid communication with the pump 104. Optionally, one or more sanitizers (not pictured) are placed along the flow path from the meltwater storage volume 146 to sanitize meltwater before it is used to make ice 132 or directed to another line within appliance 100.

In some embodiments, ice bin 130 is mounted (e.g., removably or fixedly) to outer casing 110 below top panel 116. Ice bin 130 is moveably (e.g., rotatably or slidably) mounted on outer casing 110 to selectively permit access to bin volume 134 of ice bin 130. Specifically ice bin 130 is disposed to move at least partially in and out of the outer casing 110 at the primary opening such that a user may selectively gain access to ice 132 within ice bin 130 through bin opening 176

In certain embodiments, at least one wall (e.g., front sidewall 184) of ice bin 130 is visible from outside outer casing 110. For instance, the front sidewall 184 fits within primary opening in an outer panel of outer casing 110. Additionally or alternatively, the front sidewall 184 may be formed from a clear, see-through (i.e., transparent or translucent) material, such as a clear glass or plastic, such that a user can see into the storage volume of ice bin 130 and thus view ice 132 therein. One or more internal sidewall **186*s* 186 may extend from the front sidewall 184 and be spaced apart from an inner surface 190 of outer casing 110**.

In certain examples, a heater 192 is provided proximal to the ice bin 130. The heater 192 is provided to melt the ice 132 housed in the ice bin 130 more rapidly than ambient temperature (e.g., in order to prepare the appliance 100 for cleaning). The heater 192 is in thermal communication with the ice bin 130 (e.g., conductive or convective thermal communication to direct heat thereto). The heater 192 is further in operative communication with a controller 262, which is discussed in more detail below. A heater thermistor 194 or other sensor (e.g., including a resistance temperature detector or an integrated circuit) is further provided proximal to the ice bin 130 to determine the presence of ice 132 in the ice bin 130. For example, a heater thermistor 194 may be mounted on or proximal to the ice bin 130 to determine a temperature within the ice bin 130. A predetermined temperature detected by the heater thermistor 194 and received by the controller 262 may indicate the ice bin 130 has no ice in an ice bin 130 storage volume.

As described above, appliance 100 includes meltwater tank 142. Meltwater tank 142 is in fluid communication with ice bin 130 and pump 104. Meltwater tank 142 is downstream of water tank 128. The pump 104 is downstream of meltwater tank 142. Meltwater tank 142 is in between water tank 128 and pump 104. In some embodiments, meltwater tank 142 is vertically below the ice bin 130 for acceptance of melted ice water from the ice bin 130 by way of the drain aperture 178. Meltwater tank 142 may further be in fluid communication with the ice bin 130 to accept a volume of cleaning solution from the ice bin 130 by way of the aperture 178. In certain embodiments, meltwater tank 142 is in fluid communication with a cleaning solution tank 196 and is downstream from cleaning solution tank 196. Certain embodiments that include cleaning solution tank 196 are described in more detail below.

Figure 4A:
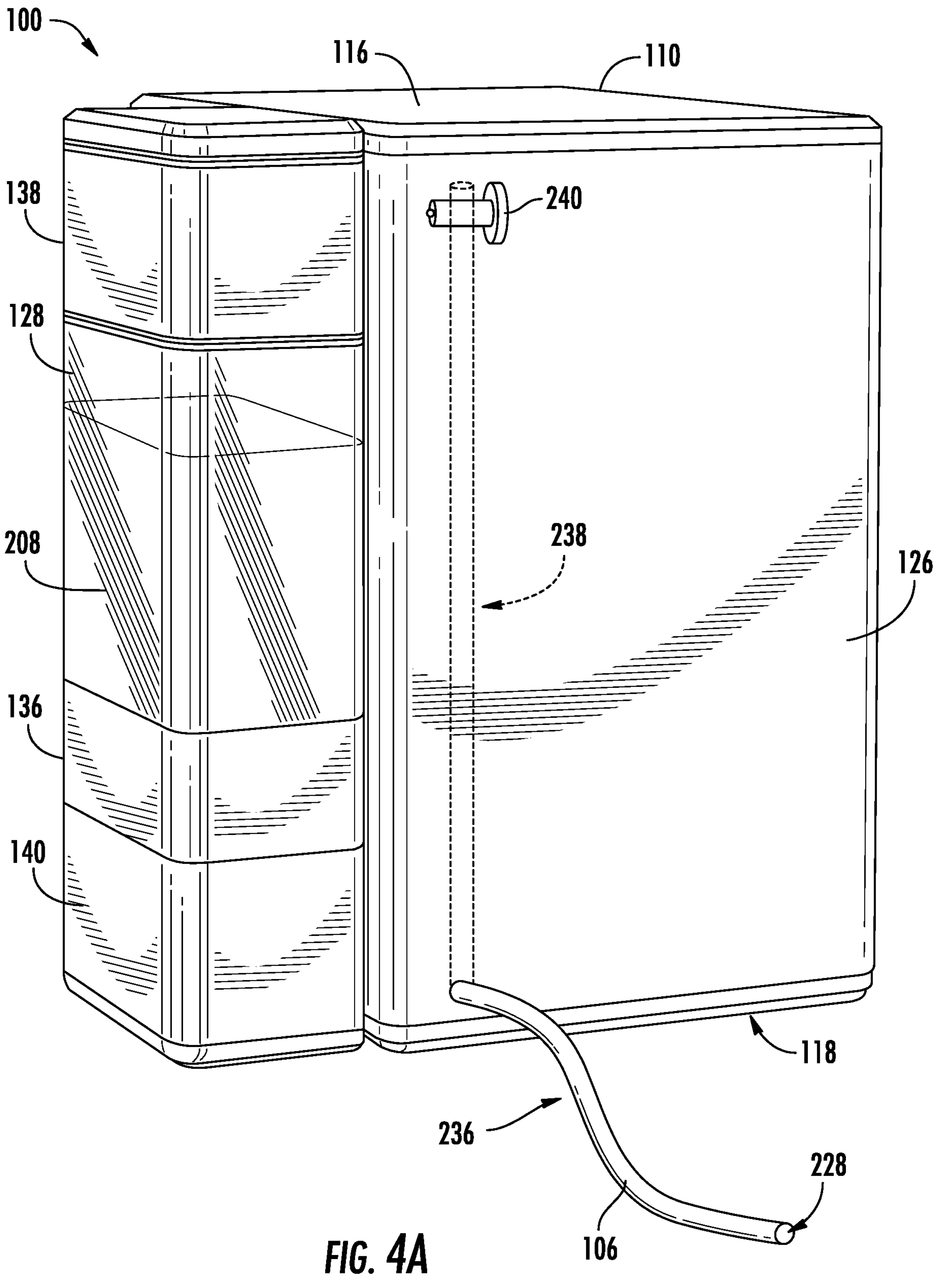
FIG. 4A provides a perspective view of a portion of the household appliance of FIG. 1.

In optional embodiments, a light source 198 is mounted within the outer casing 110. Generally, during operation, light source 198 selectively emits or directs light into ice bin 130, illuminating any ice 132 therein. Light source 198 may include a suitable light-emitting element, such as one or more fluorescent bulbs or light emitting diodes (LEDs). In exemplary embodiments, light source 198 is positioned above bin opening 176. For instance, light source 198 is mounted to a bottom surface of top panel 116 above bin door 182. Along with illuminating ice bin 130 when bin door 182 is closed, light source 198 provides illumination for a user when bin door 182 is open, such that a user can see the contents of ice bin 130. As shown in FIG. 4, a second light source 200 may be provided to the reservoir tank. The second light source 200 includes a suitable light-emitting element, such as one or more fluorescent bulbs or light emitting diodes (LEDs). The second light source 200 provides illumination for a user to see the contents of the water reservoir 180 when the ice bin 130 has been removed and the water reservoir 180 is visible.

As discussed herein, appliance 100 is configured to make nugget ice, which is becoming increasingly popular with consumers. Ice 132 may be nugget ice. Generally, nugget ice is ice that that is maintained or stored (i.e., in bin volume 134 of ice bin 130) at a temperature greater than the melting point of water or greater than about thirty-two degrees Fahrenheit. Accordingly, the ambient temperature of the environment surrounding the ice bin 130 may be at a temperature greater than the melting point of water or greater than about thirty-two degrees Fahrenheit. In some embodiments, such temperature may be greater than forty degrees Fahrenheit, greater than fifty degrees Fahrenheit, or greater than sixty degrees Fahrenheit.

The water reservoir 180 is in fluid communication with the ice maker 102 and the pump 104. Optionally, the water reservoir 180 may be in direct fluid communication with the ice maker 102 and the pump 104 (e.g., such that no intermediate containers or elements—other than a connecting conduit—are provided along the fluid path between pump 104 and water reservoir 180 or between water reservoir 180 and ice maker 102). In certain embodiments, the water reservoir 180 is further in fluid communication the auger casing 152. Water reservoir 180 is downstream of pump 104 and meltwater tank 142 (e.g., to accept fluid from the meltwater tank 142). For instance, the water reservoir 180 may accept fluid from the water tank 128 by way of the pump 104. Water reservoir 180 may be upstream of auger casing 152, as fluid in the water reservoir 180 may flow into auger casing 152. In certain embodiments, auger casing 152 and water reservoir 180 accept fluid motivated by pump 104 in tandem. For instance, water within water reservoir 180 may be displaced by new water from pump 104, thereby causing the water within water reservoir 180 to flow to auger casing 152. During use, water reservoir 180 may generally house water motivated by the pump 104 to the ice maker 102. The water reservoir 180 thus receives water to be provided to the ice maker 102 for the production of ice 132.

The water reservoir 180 is disposed within the outer casing 110. A top portion 202 of the water reservoir 180 is located vertically at or above a top portion 202 of the ice maker 102. In some examples, the water reservoir 180 has a top fluid fill level 204, and the top fluid fill level 204 is about vertically equal to the auger casing 152. The positioning of the water reservoir 180 relative to the ice maker 102, specifically the auger casing 152 allows that filling the water reservoir 180 to the top fluid fill level 204 also fills the ice maker 102, specifically the auger casing 152.

Figure 5:
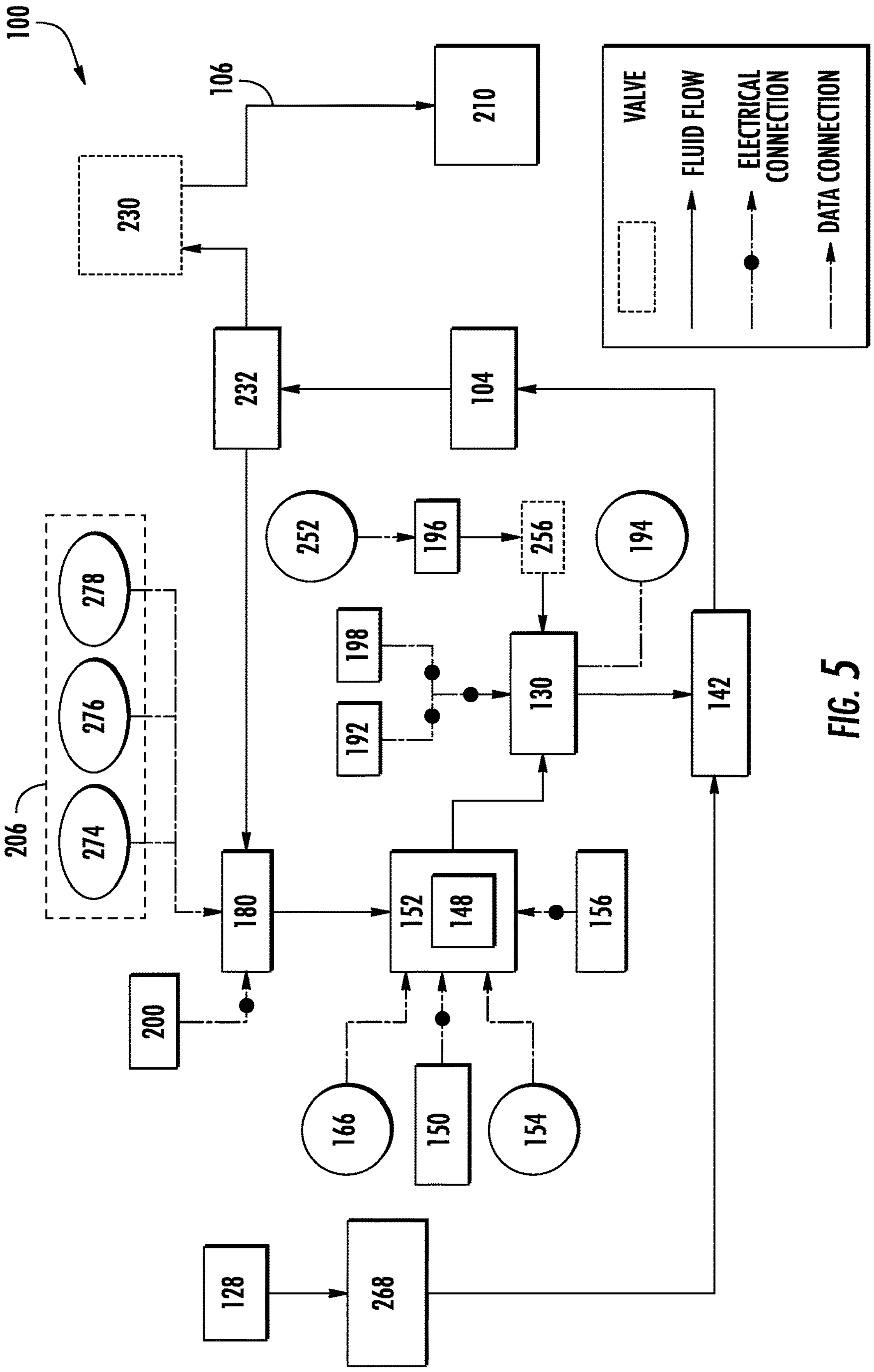
FIG. 5 provides a schematic view of an ice making unit as described herein.

In some examples, the water reservoir 180 further has a liquid sensor 206 to detect a predetermined liquid volume present in the water reservoir 180. The liquid sensor 206 may mounted to the water reservoir 180. For example, the liquid sensor 206 detects a liquid volume level as full. The liquid sensor 206 further detects a not full liquid volume. In certain examples, the liquid sensor 206 detects a quantitative liquid volume present in the water reservoir 180. As shown in FIG. 5, the liquid sensor 206 is a float sensor configured to detect a liquid volume level as either upper level 274, middle level 276, or lower level 278. The liquid sensor 206 may be any suitable detection sensor, such as a capacitance sensor, IR sensor, conduction sensor, diaphragm sensor, optical sensor, vibrating sensor, ultrasonic sensor, radar sensor, capacitance sensor, other sensor capable of detecting the presence or level of a volume of fluid in a container.

As discussed, in exemplary embodiments, the pump 104 directs the flow of water from the water tank 128 to the ice maker 102 for use in forming ice 132. The pump 104 is disposed within the outer casing 110. The pump 104 is in fluid communication with the water tank 128. A water storage volume (e.g., meltwater storage volume 146) is located in the water tank 128. The pump 104 is in fluid communication with the ice maker 102 to flow water from the water tank 128 to the ice maker 102. The pump 104 is further in fluid communication a drain tube 106 and can provide fluids through the drain tube 106. Generally, pump 104 is disposed in fluid communication with the meltwater storage volume 146. In some embodiments, water is flowable from the meltwater storage volume 146 through at least one meltwater aperture 212 defined in the meltwater tank 142, such as in a meltwater sidewall 214 thereof. Additionally or alternatively, meltwater aperture 212 is defined in another portion of meltwater tank 142, such as meltwater base wall 216. When activated, pump 104 may actively flow water from the meltwater storage volume 146 therethrough and from the pump 104.

In optional embodiments, pump 104 is positioned above the meltwater base wall 216, e.g., in the vertical direction V. Water actively flowed from the pump 104 may be flowed (e.g., through a suitable conduit) to water reservoir 180. For example, water reservoir 180 defines a reservoir storage volume 218. In some embodiments, reservoir storage volume 218 is defined by one or more reservoir sidewalls 220 and a reservoir base wall 222. Reservoir storage volume 218 is, for example, in fluid communication with the pump 104 and thus receives water that is actively flowed from the water tank 128 by way of the meltwater tank 142, such as through the pump 104. During operation, water may be flowed into the reservoir storage volume 218 through a reservoir aperture 224 defined in the water reservoir 180. Thus, when pump 104 is activated, reservoir storage volume 218 may receive water that is actively flowed from the meltwater tank 142 through the pump 104.

As shown, water reservoir 180 and reservoir storage volume 218 thereof receive and contain water to be provided to an ice maker 102 for the production of ice 132. Accordingly, reservoir storage volume 218 is in fluid communication with ice maker 102. Reservoir storage volume 218 is in direct fluid communication with the auger casing 152. Water actively flowed from the pump 104 may be flowed to the ice maker 102 (e.g., to auger casing 152). Reservoir storage volume 218 is orientated with the ice maker 102 such that filling the reservoir storage volume 218 with fluid also fills the ice maker 102 (e.g., an auger casing volume 226). Ice maker 102 generally receives water, such as from water reservoir 180 or pump 104. After water is received by ice maker 102, ice maker 102 generally freezes the water to form ice 132.

Drain tube 106 is located downstream from the pump 104. The drain tube 106 is in fluid communication with the water tank 128 and further has a resting position 238 (e.g., as shown in phantom lines in FIG. 4) and a cleaning position 236 (e.g., as shown in solid lines in FIG. 4). The drain tube 106 is not connected to residential or municipal plumbing or networks. The drain tube 106 is configured to allow fluid to flow out of the appliance 100 when in the cleaning position. In some examples, at least a portion of the drain tube 106 is located external to the outer casing 110. Drain tube 106 defines an exit point 228. The exit point 228 is located vertically below the ice maker 102 when drain tube 106 is in the cleaning position.

In some examples, the drain tube 106 further includes a drain valve 230. The drain valve 230 is in fluid communication with the pump 104 and the drain tube 106 and allows fluid to flow out of the drain tube 106 when the drain valve 230 is open. The drain valve 230 is located downstream of the pump 104 and upstream of the drain tube 106. In certain examples, the drain valve 230 is attached to a manifold 232 that is downstream and in fluid communication with the pump 104. The manifold 232 allows pump 104 to direct fluid to the ice maker 102 or to the drain tube 106. The manifold 232 is further located upstream of the drain tube 106.

The resting position 238 of the drain tube 106 is a position that does not allow fluid to leave the appliance 100 by way of the exit point 228 of the drain tube 106. The cleaning position 236 of the drain tube 106 is a position that allows fluid to leave the appliance 100 by way of the exit point 228 of the drain tube 106. The resting position 238 of the drain tube 106 may further include a physical location distinct from the cleaning position 236 of the drain tube 106. For example, resting position 238 has the exit point 228 of the drain tube 106 removably secured to an upper position on the rear panel 126 of the outer casing 110 (e.g., by resting clip 240), and cleaning position 236 has the exit point 228 of the drain tube 106 lowered below the bottom panel 118 of the outer casing 110.

In some examples, the drain valve 230 is positioned along the drain tube 106, with the cleaning position including opening the drain valve 230 and the resting position including closing the drain valve 230. In some examples, the resting position includes retracting the drain tube 106 inside or at least a majority of the drain tube 106 inside the outer casing 110, and the cleaning position includes extending a portion of the drain tube 106 outside the outer casing 110. In some examples, the resting position includes providing a clamp to the drain tube 106 and the cleaning position includes removing a clamp from the drain tube 106.

In optional embodiments, the cleaning position of the drain tube 106 is vertically downward from the water tank 128. The cleaning position may be laterally or transversely askew from the water tank 128 or pump 104 or may be in line laterally or transversely in some examples. The downward position of the drain tube 106 in the cleaning position may aid draining the appliance 100 of fluid, and a pump 104 may further aid in removing fluid from the appliance 100 by way of the drain tube 106. In some examples, the cleaning position further includes placing the drain tube 106 into a draining volume 210, including a bucket, sink, or drain tank.

At least one drain tube 106 may be included with the appliance 100. In some examples more than one drain tube may be used, for example, two or three drain tubes. In certain examples, the appliance 100 includes two drain tubes, a first drain tube connected to the pump 104 and a second drain tube connected to the water reservoir 180, the pump 104 pumping fluid through a first drain tube from the meltwater tank 142 and the pump 104 pumping fluid through the second drain tube from the water reservoir 180. Additionally or alternatively, each drain tube 106 of the appliance 100 may include a drain valve 230.

Figure 4B:
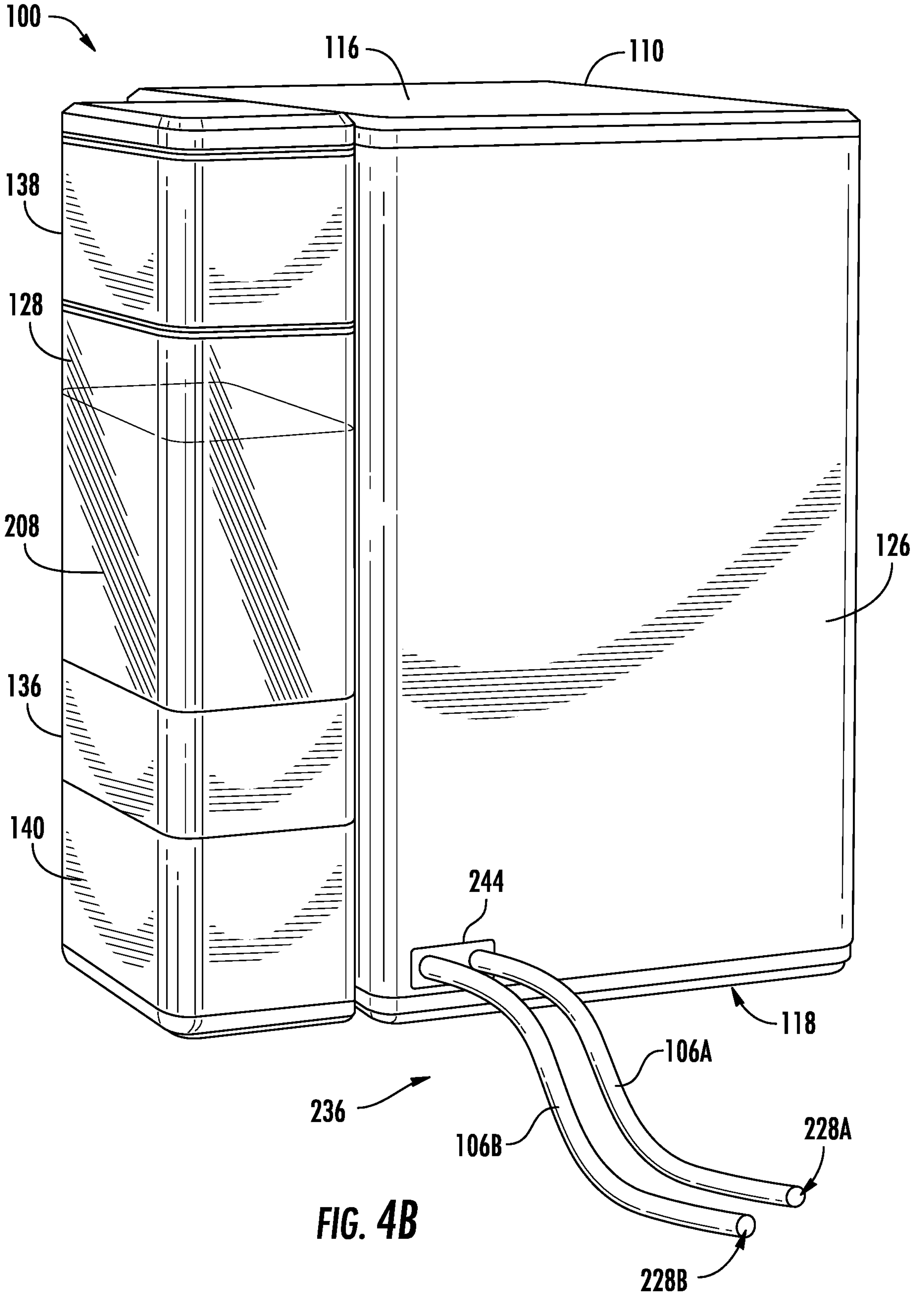
FIG. 4B provides a perspective view of a portion of an exemplary household appliance as described herein.

As shown in FIG. 4B, in some examples, the first drain tube 106A and second drain tube 106B are located at a common exit cavity 244 in the outer casing 110. The common exit cavity 244 is located on the rear panel 126 of the outer casing 110, on a lower vertical portion of the rear panel 126. In some other examples, the first and second drain tubes 106A, 106B are located at two different exit cavities in the outer casing 110 (not shown). The first drain tube 106A has a first exit point 228A, and the second drain tube 106B has a second exit point 228B. The first and second exit points 228A, 228B are disposed outside the outer casing 110. The first exit point 228A and the second exit point 228B are further located in a position vertically below the appliance 100 when the first and second drain tubes 106A, 106B are in the cleaning position 236.

Alternatively or additionally, some examples of the appliance 100 include a cleaning solution tank 196. The cleaning tank may be disposed within the outer casing 110. The cleaning solution tank 196 may be configured to house a volume of cleaning fluid. The cleaning solution tank 196 may be in fluid communication with the pump 104. The cleaning solution tank 196 may be in direct fluid communication with the pump 104 or may be indirectly in fluid communication with the pump 104, for example, by way of the meltwater tank 142. The cleaning solution tank 196 may have a level sensor 252 or other indicator to detect the presence of cleaning solution. The cleaning solution tank 196 may have an inlet that is accessible for a user to place cleaning solution in the cleaning solution tank 196. The cleaning solution tank 196 further may include an outlet, the outlet providing liquid communication between the cleaning solution tank 196 and the pump 104. The outlet further may include a cleaning valve such that cleaning solution is contained within the cleaning solution tank 196 or expelled from the cleaning solution tank 196 towards the pump 104 (e.g., by opening cleaning valve 256, as would be understood). In certain examples, the cleaning solution tank 196 outlet and cleaning valve 256 are directly connected to the ice bin 130. In certain other examples, the cleaning tank outlet and cleaning valve 256 are directly connected to the meltwater tank 142. In still other certain examples, the cleaning tank outlet and cleaning valve 256 are directly connected to the pump 104, or a line directly connected to the pump 104.

A controller 262 is in operative communication with the sealed system, such as with the compressor 168 thereof, and activates the sealed system as desired or required for ice making purposes.

The controller 262 is also in operative communication with the pump 104. Such operative communication may be via a wired or wireless connection and may facilitate the transmittal or receipt of signals by the controller 262 and pump 104. Controller 262 is configured to activate the pump 104 to actively flow water. For example, controller 262 may activate the pump 104 to actively flow water therethrough when, for example, water reservoir 180 requires water. Suitable liquid sensor(s) 206, for example, may be provided in the reservoir storage volume 218. The liquid sensor(s) 206 may be in operative communication with the controller 262 and may be configured to transmit signals to the controller 262, which indicate whether or not additional water is desired in the water reservoir 180. When controller 262 receives a signal that water is desired, controller 262 may send a signal to pump 104 to activate pump 104.

The controller 262 is further in operative communication with the ice maker 102. The controller 262, for example, sends a signal to the auger motor 150 to rotate the auger 148 during ice 132 production.

The controller is in operative communication with the control panel 282, including user interface 284, to receive user inputs therefrom and to direct the display of messages, lights, or other communication to the user by use of the user interface 284. The user interface 284 may include a button, a knob, a graphical user interface, a combination of elements, or another control mechanism as known in the art.

The appliance 100 may include an automated cleaning operation. During the cleaning operation, a cleaning cycle is run, and one or more rinsing cycles may follow the cleaning cycle. During the cleaning cycle, the volume of cleaning solution enters the ice bin 130 after all ice 132 is removed from the ice bin 130 and the drain tube 106 is placed in the cleaning position. The volume of cleaning solution drains through the drain port in the ice bin 130 to the meltwater tank 142. An ice valve 268 is in fluid communication with the meltwater tank 142 and the water tank 128, controlling the flow of fluid from the water tank 128 to the meltwater tank 142. The ice valve 268 opens to allow water to enter the meltwater tank 142. The ice valve 268 is closed when a cleaning volume of water has entered the meltwater tank 142. The cleaning volume of water mixes with the volume of cleaning solution, forming a volume of mixed cleaning solution in the meltwater tank 142.

The pump 104 then motivates the volume of mixed cleaning solution through the manifold 232 and into the water reservoir 180. The ice maker 102, including the auger casing 152 and auger 148, fills with the filling of the water reservoir 180.

At least a portion of the volume of mixed cleaning solution fills the water reservoir 180 as the pump 104 circulates the volume of mixed cleaning solution from the meltwater tank 142. The mixed cleaning solution further fills the auger casing 152 as the water reservoir 180 fills, as the pump 104 is in fluid communication with the water reservoir 180 and the auger casing 152. Auger motor 150 turns the auger 148 within the auger casing 152, which moves the mixed cleaning solution through the ice maker 102, across the chute 160, and into the ice bin 130. The volume of mixed cleaning solution is then drained through a drain valve 230 and out a drain tube 106 and into a draining volume. The pump 104 may motivate the mixed cleaning solution through the drain tube 106. The drain valve 230 is opened during the draining of the volume of mixed cleaning solution and then closed.

Rinsing cycles follow the draining of the volume of mixed cleaning solution. There may be at least one rinsing cycle. Each rinsing cycle includes pumping a volume of water from the water tank 128 through the pump 104 and into the water reservoir 180 and the auger casing 152. Liquid sensor 206 in water reservoir 180 detects a set water level in the water reservoir 180. Liquid sensor 206 is in operative communication with the controller 262 and detects at least a set level of fluid in the water reservoir 180. In some examples, liquid sensor 206 has more than one level of fluid in the water reservoir 180 that it can detect. In certain examples, liquid sensor 206 has an upper level 274, a middle level 276, and a lower level 278 that it can detect and send to the controller 262. Controller 262 receives the water reservoir 180 level from liquid sensor 206.

When liquid sensor 206 indicates that the set level of fluid is reached in the water reservoir 180 (e.g., upper level 274), the pump 104 turns off. Auger casing 152 fills as water reservoir 180 fills with the volume of water. When controller 262 receives an indication of an upper level 274 in the water reservoir 180 from liquid sensor 206, controller 262 turns off pump 104 in response. Water flows out of the auger casing 152 by way of auger 148 turning by way of auger motor 150, down chute 160, and into ice bin 130. At least a portion of the volume of water collects in the meltwater tank 142 by way of the drain aperture 178. In some examples, a portion of the volume of water also collects in the water reservoir 180. The drain valve 230 is then opened and the volume of water flows through the drain tube 106 and out the exit point 228, leaving appliance 100. This rinse cycle may repeat a set number of times before completion of the cleaning operation. After completion of the last drain of the last rinse cycle, the drain tube 106 is returned to the resting position. The appliance 100 then exits cleaning operation. In some examples, the ice maker 102 resumes ice making mode and begins to make ice 132 again as described above.

Turning especially to FIG. 5, the controller 262 is configured to initiate a cleaning operation. The controller 262 further receives a cleaning indication. The controller 262 receives the cleaning indication from a user. For example, the user may press a button on a control panel or otherwise indicate a desire to begin a cleaning operation on a user interface externally located on the outer casing 110.

In some examples, the cleaning operation includes receiving a cleaning preparation confirmation indication. Receiving a cleaning preparation confirmation indication may include confirming ice 132 is absent from the household appliance 100 prior to pumping a volume of cleaning solution through the ice maker 102, directing the drain tube 106 to the cleaning position, receiving an indication that the drain tube 106 is in the cleaning position, directing an addition of cleaning solution to the household appliance 100, and confirming a presence of cleaning solution in the household appliance 100. The controller 262 may direct the placement or display of a notification on the user interface indicating the user should remove ice 132 from the ice bin 130, place the drain tube 106 in draining volume 210, and place a volume of cleaning solution in the ice bin 130. In certain embodiments, the controller 262 may direct the placement or display of a request to confirm that ice 132 has been removed from the ice bin 130, the drain tube 106 has been placed draining volume 210 (e.g., bucket, sink), and a volume of cleaning solution is in the ice bin 130. The controller 262 may pause the cleaning operation until receiving a cleaning preparation confirmation indication. In some examples, the cleaning preparation confirmation indication may include receiving a user's indication such as the user pressing a button on the user interface, or selecting an icon on the user interface, indicating that cleaning preparations have been completed. Cleaning preparations include removing ice 132 from the ice bin 130, adding cleaning solution to the ice bin 130, and placing the drain tube 106 in the cleaning position (e.g., into draining volume 210). For example, the user indicates cleaning preparations are completed by pressing "yes" on a user interface in response to a prompted question provided by the controller 262 asking if cleaning preparations have been performed. A button may be pressed to indicate a user has performed the cleaning preparations as well.

Confirming ice 132 is absent from the household appliance 100 prior to pumping a volume of cleaning solution through the ice maker 102 includes requesting confirmation from a user on a user interface that ice 132 is absent from the household appliance 100 (e.g., ice bin 130 is empty). In some examples, the confirming ice 132 is absent includes presenting the user with an indication that all ice 132 needs to be removed from the ice bin 130 to proceed with cleaning. The user may need to confirm removal of ice 132 from the ice bin 130 to continue with the cleaning operation. This may be done, for example, on a user interface (e.g., in response to a user pressing or engaging a button thereon).

In certain examples, activating the heater 192 is performed prior to confirming ice 132 is absent from the appliance 100. The heater 192, when activated, heats up the bin volume 134 of the ice bin 130, causing any ice 132 present to melt. The resultant liquid is removed from the ice bin 130 by way of the drain aperture 178 into the meltwater tank 142. Confirming ice 132 is absent from the appliance 100 prior to pumping cleaning solution through the ice maker 102 further includes confirming ice 132 is absent from the ice bin 130. A sensor (e.g., heater thermistor 194) detects when all ice 132 is melted. Thus, confirming ice 132 is absent from the appliance 100 may be a fully automated procedure, and confirming ice 132 is absent from the appliance 100 may include receiving a sensor indication that ice 132 is absent from the ice bin 130.

Directing the drain tube 106 to the cleaning position includes requesting confirmation from a user that the drain tube 106 has been placed into the cleaning position. Receiving an indication that the drain tube 106 is in the cleaning position may include receiving a confirmation that the drain tube 106 is in the cleaning position from the user interface (e.g., in response to a user pressing or engaging a button thereon).

In some examples, directing the drain tube 106 to the cleaning position further includes requesting confirmation from a user that each exit point 228 of the drain tube 106 is placed into a draining volume. Additionally, receiving an indication that the drain tube 106 is in the cleaning position further includes receiving an indication that each exit point 228 of the drain tube 106 is in the draining volume (e.g., a user indication on the user interface that the drain tube 106 is in draining volume 210 such as a bucket or other receptacle).

In some embodiments, the controller 262 directs the pump 104 to motivate remaining fluid in the appliance 100 through the drain tube 106 following receiving the cleaning indication. Motivating remaining fluid in the appliance 100 through the drain tube 106 may further follow confirming ice 132 is absent from the household appliance 100. The drain valve 230 is opened to allow the remaining fluid to flow out of the appliance 100.

Directing an addition of cleaning solution to the household appliance 100 includes requesting confirmation from a user that the cleaning solution has been added to the household appliance 100. It may include requesting confirmation from a user that the cleaning solution has been added to the ice bin 130.

In certain examples, confirming a presence of the cleaning solution in the household appliance 100 includes receiving a level signal from the level sensor 252 attached to the cleaning solution tank 196. Receiving a level signal at a predetermined level confirms the presence of a volume of cleaning solution in the appliance 100. If an appropriate level of cleaning solution is not present in the cleaning solution tank 196, the controller 262 prompts a user to add an addition of cleaning solution to the appliance 100, receive a second level signal from the level sensor 252. Such steps may be repeated until the predetermined level is confirmed.

In some examples, directing an addition of cleaning solution to the household appliance 100 includes opening the cleaning valve on the cleaning solution tank 196 to allow cleaning solution to be in direct liquid communication with the pump 104. In certain examples, directing an addition of cleaning solution to the household appliance 100 includes sending a signal to the cleaning valve on the outlet of the cleaning solution tank 196 directing it to open. Directing an addition of cleaning solution to the household appliance 100 may include requesting confirmation that the cleaning valve on the outlet of the cleaning solution tank 196 has been opened.

As mentioned above, confirming ice 132 is absent from the household appliance 100 prior to pumping a volume of cleaning solution through the ice maker 102, directing the drain tube 106 to the cleaning position, receiving an indication that the drain tube 106 is in the cleaning position, directing an addition of cleaning solution to the household appliance 100, and confirming a presence of cleaning solution in the household appliance 100 may be performed externally, e.g., by the user, with the user confirming the cleaning solution is in the ice maker 102, ice 132 is removed from the appliance 100, and the drain tube 106 is in the cleaning position. Confirming these actions have been taken may be confirmed individually or together in preparation for the controller 262 to initiate the cleaning cycle. Confirmation of these actions is performed on a user interface in electronic communication with the controller 262.

The controller 262 may initiate a cleaning cycle in response to receiving the cleaning indication. In some embodiments, the cleaning cycle includes pumping a volume of cleaning solution through the ice maker 102. The cleaning cycle includes directing the volume of cleaning solution through the drain tube 106. As shown in FIG. 5, the pump 104 may be directed by the controller 262 to pump 104 the volume of cleaning solution through the ice maker 102. Pumping the volume of cleaning solution through the ice maker 102 may include the controller 262 further initiating pumping a volume of cleaning solution to fill the water reservoir 180 and the ice maker 102. In other words, the controller 262 may direct the pump 104 to pump 104 the volume of cleaning solution to fill the water reservoir 180 and the ice maker 102. In some embodiments, pumping the volume of cleaning solution to fill the water reservoir 180 and the ice maker 102 further includes pumping the volume of cleaning solution to fill the water reservoir 180 and the auger casing 152. In some embodiments, pumping the volume of cleaning solution through the ice maker 102 includes the controller 262 directing the pump 104 to motivate the volume of cleaning solution from the ice bin 130 through the ice maker 102. Motivating the volume of cleaning solution from the ice bin 130 through the ice maker 102 may include motivating the volume of cleaning solution from the ice bin 130 to the water reservoir 180. In some embodiments, motivating the volume of cleaning solution from the ice bin 130 through the ice maker 102 further includes motivating the volume of cleaning solution from the ice bin 130 through the water reservoir 180 and the auger casing 152. As a result of motivating the volume of cleaning solution through the ice maker 102, the water reservoir 180 and the auger casing 152 may each be filled with at least a portion of the volume of cleaning solution. As used herein, motivating a fluid includes pumping a fluid, for example, pumping a fluid by use of the pump 104.

After the volume of cleaning solution is motivated or pumped to the water reservoir 180, the controller 262 may receive a full tank indication that the water reservoir 180 is filled and, subsequently, direct pumping the volume of cleaning solution through the drain tube 106. In some embodiments, the full tank indication is sent by the liquid sensor 206 in the water reservoir 180 to the controller 262 (e.g., in response to the volume of cleaning solution reaching the full tank level within the water reservoir 180). The volume of cleaning solution then drains by the controller 262 directing the pump 104 to pump 104 the volume of cleaning solution out of the ice maker 102 through the drain tube 106. For example, the pump 104 may directed to pump 104 the volume of cleaning solution out of the auger casing 152 and water reservoir 180 and through the drain tube 106.

The cleaning cycle includes pumping a volume of cleaning solution through the ice maker 102 and directing the volume of cleaning solution through the drain tube 106. The pump 104 is directed by the controller 262 to pump 104 the volume of cleaning solution through the ice maker 102. The controller 262 directs pumping the volume of cleaning solution through the water reservoir 180 and the auger casing 152. The controller 262 further directs pumping a volume of cleaning solution to fill the water reservoir 180 and the ice maker 102. The pump 104 motivates cleaning solution from the ice bin 130 through the ice maker 102. This may further include directing the pump 104 to motivate or pump the volume of cleaning solution from the ice bin 130 to the water reservoir 180, which fills the auger casing 152.

The controller 262 receives a full tank indication that the water reservoir 180 is filled. The controller 262 then directs pumping the volume of cleaning solution through the drain tube 106 in response to the full tank indication. The full tank indication is sent by the liquid sensor 206 in the water reservoir 180 to the controller 262. The volume of cleaning solution then drains by the controller 262 directing the pump 104 to motivate or pump the volume of cleaning solution out of the ice maker 102 through the drain tube 106. For example, the pump 104 is directed to motivate or pump the volume of cleaning solution out of the auger casing 152 and water reservoir 180 and through the drain tube 106.

In some examples, the volume of cleaning solution includes a volume of cleaning solution from the ice bin 130 and a volume of water from the water tank 128. The pump 104 directs the two to mix and then pump 104 the mixture through the ice maker 102. The cleaning cycle further includes directing an addition of cleaning solution to the ice bin 130, confirming a presence of cleaning solution in the ice bin 130, and mixing a volume of cleaning solution with a volume of water in the meltwater tank 142 to form a mixed cleaning solution. Pumping a volume of cleaning solution through the ice maker 102 further includes pumping the mixed cleaning solution from the meltwater tank 142 through the ice maker 102 during the cleaning cycle.

Pumping the volume of cleaning solution through the ice maker 102 includes pumping the volume of cleaning solution and water through the pump 104 and into the water reservoir 180. The controller 262 may then receive a volume signal from the liquid sensor 206 (e.g., the float sensor) to indicate the presence of the predetermined liquid volume within the water reservoir 180. When the presence of the predetermined liquid volume within the water reservoir 180 is indicated by the volume signal, the controller 262 directs the drain valve 230 to open to allow the volume of cleaning solution and water to flow out of the household appliance 100 through the drain tube 106.

Following the draining of the ice maker 102, a rinse cycle may commence. In exemplary embodiments, the controller 262 determines completion of directing the volume of cleaning solution through the drain tube 106. The controller 262 then initiates rinsing cycle in response to determining completion of directing the volume of cleaning solution through the drain tube 106. Each rinsing cycle includes pumping a volume of water from the water tank 128 through the ice maker 102 and directing the volume of water through the drain tube 106. The pump 104 is directed by the controller 262 to pump 104 a volume of water from the water tank 128 to the ice maker 102 and then pump 104 the volume of water out of the appliance 100 by way of the drain tube 106.

In some examples, the pump 104 fills the water reservoir 180 with the volume of water which also fills the auger casing 152 in the ice maker 102. The controller 262 again receives an indication that the water reservoir 180 is filled, for example, the liquid sensor 206 in the water reservoir 180 indicates that the water reservoir 180 is at a full volume position. The controller 262 then directs pumping the volume of water from the ice maker 102 to the drain tube 106, and out of the appliance 100. The pump 104 pump 104 the volume of water out of the exit point 228 of the drain tube 106 as a result of this direction.

The number of rinse cycles is predetermined in some examples, selectable in some examples, and adjustable in some examples. For instance, the number of rinse cycles may be set at two or three cycles. In other examples, the number of rinse cycles may be indicated to the controller 262. This may be done prior to the controller 262 receiving the cleaning indication, or at any point prior to the commencement of the rinse cycle. In some examples, the cleaning operation includes at least two pre-defined rinse cycles.

In certain examples, a user selects the desired number of rinse cycles and indicates the number of rinse cycles to the controller 262. A user interface facilitates this indication. The number of rinse cycles may be manually chosen before the cleaning operation is activated, for example, as a setting available to a user through a user interface. In some such embodiments, the controller 262 receives a user input selection defining the number of rinse cycles. The controller 262 then defines a number of rinse cycles to complete in response to the user input. The controller 262 determines completion of directing the volume of cleaning solution through the drain tube 106 and initiates the defined number of rinse cycles in response to determining completion of directing the volume of cleaning solution through the drain tube 106.

In some embodiments, the controller 262 receives an indication that the volume of water has exited the ice maker 102. The cleaning operation further includes determining completion of the cleaning cycle and directing the drain tube 106 to the resting position in response to determining completion of the cleaning cycle. Determining completion of the cleaning cycle may further include determining completion of the rinse cycle. Directing the drain tube 106 to the resting position may include directing a completed clean cycle indication on a user interface 284 (e.g., via a display or speaker of user interface 284). The controller 262 may indicate the cleaning cycle is complete by directing the user interface to indicate the cleaning cycle is complete. This may be done by display or speaker function of the user interface 284. The controller 262 may further direct the user interface 284 to display a request to return the drain tube 106 to the resting position (e.g., place the drain tube 106 on the rear panel 126 of the outer casing 110).

After completion of the cleaning cycle, returning to ice making operations is accomplished by the controller 262 directing the pumping of a volume of water to the ice maker 102 and directing the ice maker 102 to perform an ice making cycle. In some examples, the controller 262 directs returning to the ice making cycle upon completion of the cleaning operation. In some embodiments, the controller 262 again directs the ice making cycle upon receiving an indication to return to ice making. Such indication may be received from the user interface (e.g., in response to a user pressing or engaging a button thereon).

Figure 6:
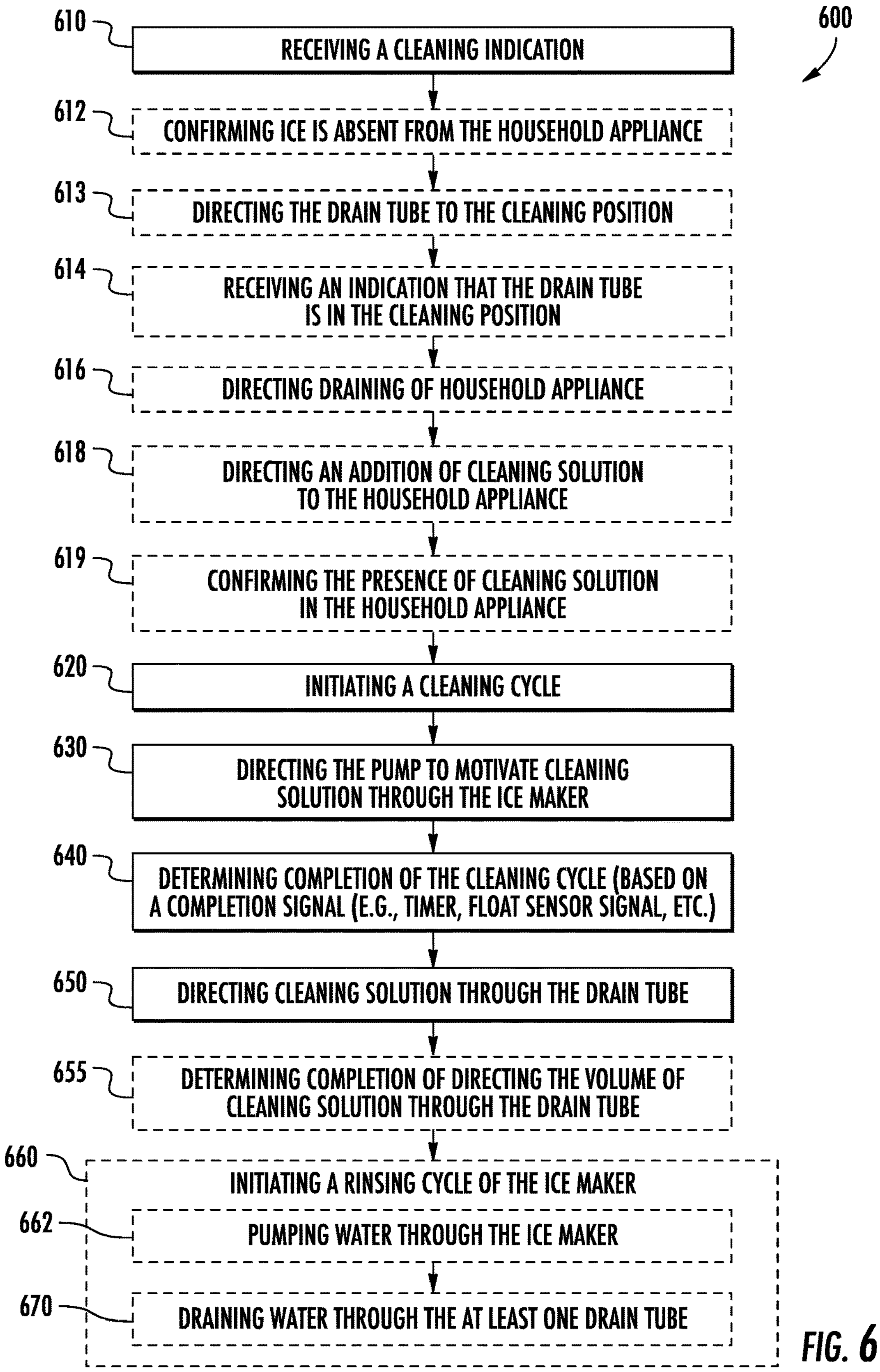
FIG. 6 provides a flow chart of an embodiment of a method for cleaning an ice-making unit as described herein.
Figure 7:
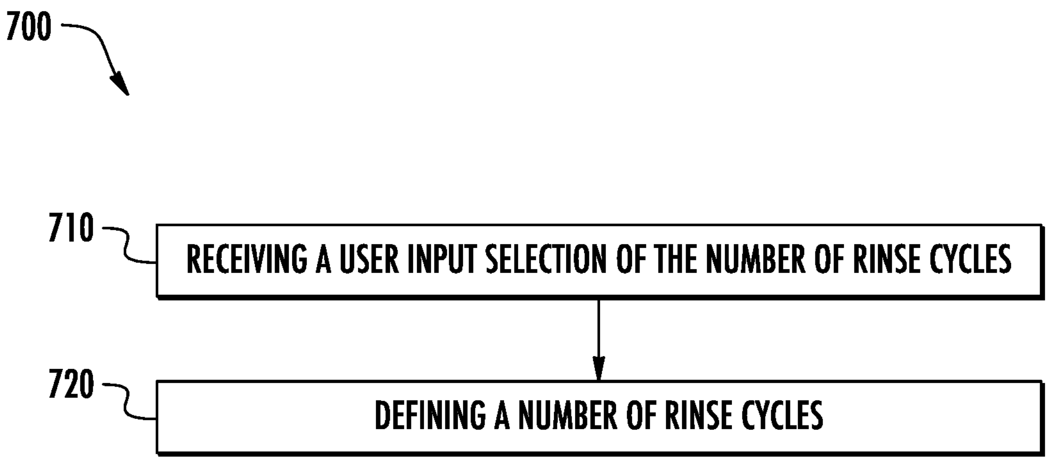
FIG. 7 provides a flow chart of an embodiment of a method for cleaning an ice-making unit as described herein.
Figure 8:
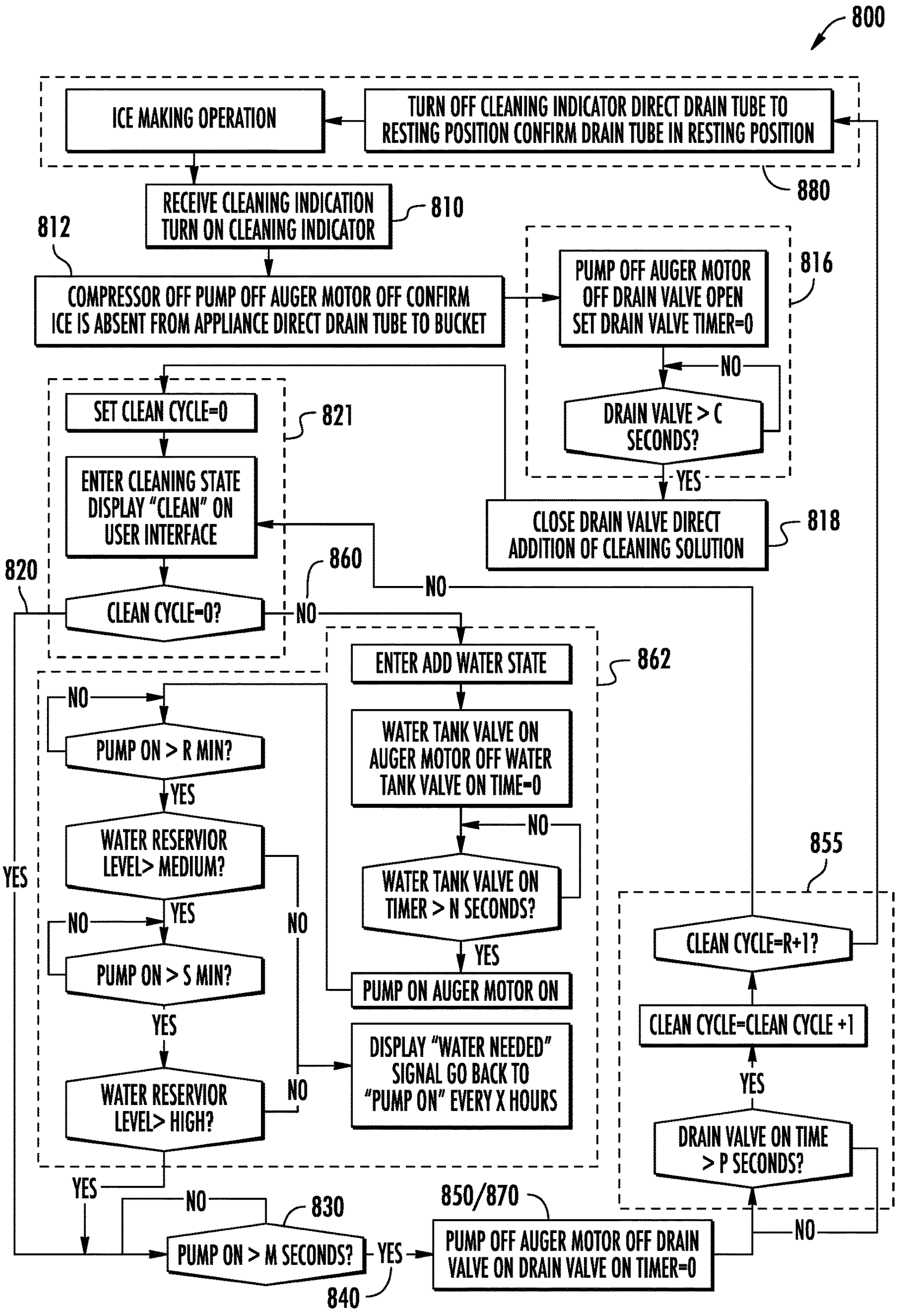
FIG. 8 provides a flow chart illustrating a method of performing a cleaning operation on an ice making appliance according to exemplary embodiments of the present disclosure.

Referring now to FIGS. 6 through 8, various methods may be provided for use with the system in accordance with the present disclosure. In general, the various steps of methods disclosed herein may, in exemplary embodiments be performed by the controller as part of an operation that the controller is configured to initiate or direct. For example, the controller is configured to initiate a cleaning operation. During such methods, controller may receive inputs and transmit outputs from various other components of the appliance. For example, controller may send and receive signals to the ice maker, pump, and user interface. In particular, the present disclosure is further directed to methods, as indicated by 600, for cleaning the appliance. Such methods advantageously facilitate cleaning of the appliance with limited user interaction following initial set up. This makes it more likely that cleaning will be performed regularly, which can ensure desired performance and prevent repair requests.

The controller is configured to initiate a cleaning operation. At 610, the method 600 includes receiving a cleaning indication. The controller receives the cleaning indication from a user. For example, the user may indicate to begin a cleaning cycle on a user interface externally located on the outer casing. The controller may receive a signal from the user interface indicating the user is selecting a button on the user interface or selecting a cleaning icon on the user interface.

At 612, the method 600 includes confirming ice is absent from the household appliance. This is prior to pumping a volume of cleaning solution through the ice maker. In some embodiments, the controller directs the user interface to indicate (e.g., via a display or speaker) that ice needs to be removed from the ice bin, with a user pressing a button or icon to indicate or confirm the ice has been removed from the ice bin. The controller receives the user's indication from the user interface, confirming ice is absent from the household appliance. A sensor may also send a signal to the controller, the sensor indicating ice is absent from the ice bin, as would be understood in light of the present disclosure.

At 613, the method 600 includes directing the drain tube to the cleaning position. More than one drain tube may be directed to the cleaning position. For example, the controller directs the user interface to display a message to the user that the drain tube needs to be placed in a draining volume, such as a bucket or other receptacle. In certain embodiments, the controller directs the user interface to display a message to the user that the drain tubes need to be placed into a drain bin located within the outer casing.

At 614, the method 600 includes receiving an indication that the drain tube is in the cleaning position. This may include receiving a confirmation from a user on a user interface that the drain tube is in the cleaning position. In some embodiments, the controller further directs the user interface to request confirmation that the drain tube is in the cleaning position. This may include receiving an indication (e.g., at the controller) from the user that the drain tube is in the cleaning position by the user pressing a button on the user interface or by the user selecting an icon on the user interface confirming that the user has placed the drain tubes in the cleaning position. Step 614 may also include receiving a sensor signal to the controller indicating the drain tube is in the cleaning position.

At 616, the method 600 includes directing draining of the household appliance. Draining the appliance occurs prior to the addition of the cleaning solution to the appliance. In some embodiments, the controller directs the pump to motivate the remaining fluid in the appliance through the drain tube. In additional or alternative embodiments, the controller directs the drain valve to open to allow the remaining fluid in the appliance to exit through the drain tube.

At 618, the method 600 includes directing an addition of cleaning solution to the household appliance. In some examples, this includes directing a user to add a volume of cleaning solution to the ice bin. The cleaning solution may be premixed or concentrated cleaning solution. In some examples, this includes directing a volume of cleaning solution to be moved from a cleaning solution tank to the ice bin, meltwater tank, or to the pump. For instance, the cleaning solution may flow through the drain aperture to the meltwater tank in preparation for motivation through the appliance. Thus, following the completion of 618, the cleaning solution is in place for the cleaning cycle.

At 619, the method 600 includes confirming a presence of cleaning solution in the household appliance. In some examples, this includes receiving a confirmation on a user interface that cleaning solution has been added to the ice bin. In some examples, this includes receiving a sensor indication that cleaning solution has been added to the meltwater tank, ice bin, or the pump. For example, receiving a signal from a float sensor that the fluid level in the meltwater tank or the ice bin has increased from a lower level to a higher level.

At 620, the method 600 includes initiating a cleaning cycle in response to receiving the cleaning indication. The controller initiates the cleaning cycle 620 in response to receiving the cleaning indication 610. Steps 612, 613, 614, 616, 618, and 619 may occur prior to 620. Initiating a cleaning cycle may include displaying a "clean" indication on the user interface. Initiating the cleaning cycle may further include closing the drain valve.

At 630, the method includes pumping or motivating a volume of cleaning solution through the ice maker. In some embodiments, he pump motivates the volume of cleaning solution from the meltwater tank to the water reservoir and the auger casing. The volume of cleaning solution flows through the auger casing. The volume of cleaning solution may then flow down the chute and into the ice bin. The volume of cleaning solution may then flow through the drain aperture and back into the meltwater tank.

Additionally or alternatively, pumping a volume of cleaning solution through the ice maker includes pumping the volume of cleaning solution through the water reservoir, filling it to a predetermined level. The process of pumping the volume of cleaning solution through the water reservoir also fills the auger casing.

At 640, the method 600 includes determining completion of the cleaning cycle. Determining completion of the cleaning cycle may include a set time being reached on a timer which was set at 620. Additionally or alternatively, a sensor signal may be received from the controller indicating completion of the cleaning cycle. In some examples, the sensor may indicate a full level on a tank (e.g., water reservoir) in the appliance. The sensor may be a float sensor in a bin or reservoir, a capacitance sensor, IR sensor, conduction sensor, diaphragm sensor, optical sensor, vibrating sensor, ultrasonic sensor, radar sensor, capacitance sensor, other sensor capable of detecting the presence or level of a volume of fluid in a container.

At 650, the cleaning cycle includes directing the volume of cleaning solution through the drain tube. For instance, after motivating the volume of cleaning solution through the ice maker, the volume of cleaning solution is directed through the drain tube. Optionally, 650 includes opening the drain valve to allow the volume of solution to drain through the drain tube. Additionally or alternatively, the pump may motivate the volume of solution out of the drain tube. In optional embodiments, the method 600 further includes determining completion of the directing the volume of cleaning solution through the drain tube at 655. For instance, the method 600 may include setting a drain valve on timer upon opening the drain valve during step 650. Determining completion of the directing the volume of cleaning solution through the drain tube may include determining that the drain valve on timer has reached a time greater than p seconds. P may be a preset numerical value. The value of p may be set based on a predetermined flow rate of the volume of cleaning solution through the drain tube. Thus, the time period of greater than p seconds indicates the volume of cleaning solution has been directed through the drain tube.

Alternatively or additionally, in response to determining completion of the directing the volume of cleaning solution through the drain tube at 655, the method includes initiating a rinsing cycle of the ice maker at 660.

At 662, the initiated rinsing cycle includes pumping a volume of water through the ice maker. The controller directs the pump to motivate a volume of water through the ice maker. At 662, the water tank valve may also be opened to allow the volume of water to flow from the water tank to the meltwater tank. The pump motivates the volume of water from the meltwater tank to the water reservoir and the auger casing. In some examples, pumping a volume of water through the ice maker at 662 includes pumping the volume of water through the water reservoir, filling it to a predetermined level. The process of pumping the volume of water through the water reservoir also fills the auger casing. Liquid sensor in the water reservoir may indicate at least a full level. At 662, motivating the volume of water through the ice maker may include motivating the volume of water to the water reservoir until the liquid sensor indicates a full level. In certain embodiments, a rinse timer is set at 662, to aid in determining when to drain the water at 670.

At 670, the initiated rinsing cycle includes draining the volume of water through the drain tube by way of the drain valve. Draining the volume of water through the drain tube may include opening the drain valve. Draining the volume of water through the drain tube may commence following receiving a full level indication from the liquid sensor. In certain embodiments, draining the volume of water through the drain tube may commence when the rinse timer reaches a predetermined time, indicating the volume of water has rinsed the ice maker.

As would be understood in light of the present disclosure, the method 600 may include multiple rinsing cycles (e.g., such that rinsing cycles are repeated a set number of times). Optionally, the set number of repeating the rinsing cycle step 660 may be predetermined (e.g., a factory preset setting), or may be user set. The method 600 may include the method 700, which includes receiving a user input selection of the number of rinse cycles at 710 and defining a number of rinse cycles at 720. The defined number of rinse cycles equals the number of repeated rinsing cycles in the method. For example, the user interface may allow a user to select a number of rinse cycles in a settings menu. In some embodiments, the rinsing cycle may be preset at a factory, with the rinse cycle repeating until the preset number of cycles have drained the volume of water through the drain tube. In some embodiments, the user indicates a desired number of rinse cycles after the controller receives a cleaning indication at 610 and before initiating a cleaning cycle at 619. The user may indicate the desired number of rinse cycles on the user interface. The controller receives the user desired number of rinse cycles from the user interface. The controller determines a number of repeats of the rinsing cycle based on the user desired number of rinse cycles. The method 600 may then include directing initiating a rinsing cycle of the ice maker the number of repeats of the rinsing cycle at 660. Each rinsing cycle may follow either the cleaning cycle or another rinsing cycle.

Turning to FIG. 8, in certain embodiments, the method 800 includes receiving a cleaning indication at 810. The controller directs the user interface to turn on a cleaning indicator at 810. The user may send the cleaning indication by way of the user interface. The user may press a button, turn a knob, indicate a selection on a graphical user interface, or another method of indication.

At 812, the method 800 includes confirming ice is absent from the appliance, directing the drain tube to the draining volume, turning the compressor off, and turning the pump off. The refrigeration system may be turned off at this step in preparation for the appliance to enter cleaning mode. The controller may direct the turning off of the refrigeration system, the compressor, and the pump.

At 816, the method 800 includes confirming the pump is off, turning the auger motor off, and opening the drain valve. At 816, a drain valve timer may be set to zero and begin to run. After the drain valve timer has run for greater than c seconds, the method may proceed. Opening the drain valve may allow remaining fluid (e.g., water present in the system when the cleaning indication was received may include partially frozen water in the ice maker) to exit the appliance by way of the drain tube.

At 818, the method 800 includes closing the drain valve and directing the addition of cleaning solution. Closing the drain valve may follow determining that the drain valve timer has surpassed c seconds. Directing the addition of cleaning solution may include directing the user interface to display a message requesting the user add a volume of cleaning solution to the appliance. The user may confirm the addition of the volume of cleaning solution to the appliance. In some embodiments, the volume of cleaning solution may be added to the ice bin, as previously discussed.

At 821, the controller begins a clean cycle count, and sets it to 0. The controller directs entrance of the appliance into a cleaning state. The controller directs the user interface to display a clean indication. For example, the user interface may display a certain color while in cleaning state. In some embodiments, the user interface may display a cleaning state message. The controller may further determine if the clean cycle count is set to 0 before moving to the next step in the method.

At 820, the controller initiates the cleaning cycle. The controller further determines the clean cycle count is set to 0.

At 830, the method includes directing the pump to motivate the volume of cleaning solution though the ice maker. The pump may pump the volume of cleaning solution through the ice maker during the cleaning cycle. The pump may pump the volume of cleaning solution for a set time, for example, for longer than m seconds. A cleaning cycle timer may be set at the start of directing the pump to motivate the volume of cleaning solution through the ice maker. The auger motor may also run during this step to aid in motivating the volume of cleaning solution through the ice maker.

Upon determining that m seconds have passed since the beginning of step 830, the method includes directing the volume of cleaning solution through the drain tube, turning the pump off, turning the auger motor off, and opening the drain valve (e.g., drain valve turned on) at 850. The volume of cleaning solution may be gravity driven out of the appliance. At 850, the drain valve on timer is set to 0, and begins tracking time.

At 855, the method includes determining completion of directing the volume of cleaning solution through the drain tube, by determining the drain valve on timer is greater than p seconds. The clean cycle count may then be added to by 1. The drain valve may be closed following determining completion of the volume of cleaning solution through the drain tube. Additionally, the controller determines if the preset number of rinse cycles, r, have completed at 855. If the clean cycle does not equal r, the present number of rinse cycles, plus one, the controller directs the rinse cycle to commence at 860.

The controller then initiates r rinsing cycles, one after the other, at 860. Each rinse cycle includes the controller directing the addition of water to the ice maker at 862. The controller directs the opening of water tank valve, direct the auger motor off, and sets a water tank valve on timer to 0 and begins tracking time. When the water tank valve on timer exceeds n seconds, the controller directs the water tank valve to close, and directs the pump to begin motivating the volume of water through the ice maker. The method also includes directing the auger motor to motivate the volume of water through the auger casing and across the chute at 862. The water reservoir is then filled, with the controller receiving a level indication from the float sensor located in the water reservoir. When the controller receives a predetermined full level for the water in the float sensor, the controller proceeds to run the pump for a predetermined time, m seconds.

The method then repeats steps 830, 840, 850, and 855, this time motivating the volume of water instead of the volume of cleaning fluid through the drain tube. At 855, the clean cycle is added to by 1, and the rinse cycle repeats as long as the clean cycle has not been set to the number of rinse cycles, r, plus 1.

The appliance further has an indication for water needed at 862. The method at 862 then further includes determining if a water reservoir level is greater than medium after the pump has been motivating water for m minutes, and determining if a water reservoir level is greater than full after the pump has been motivating water for s minutes. If the controller does not receive a medium indication from the float sensor, the controller indicates water needed, and pauses the rinsing cycle. When the controller receives a water added signal, for example, from a user by way of the control panel, the controller directs the return to the rinse cycle.

Upon completion of the predetermined number of rinse cycles, r, the clean cycle equals r plus 1 at 855. The controller then directs the control panel to turn off the cleaning indicator and to direct the drain tubes to be placed in the resting position at 880. The controller then returns the appliance to the making ice state at 880. Ice making operations then recommence.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A household appliance, comprising:

an outer casing;

a water tank attached to the outer casing;

an ice maker disposed within the outer casing, the ice maker in fluid communication with the water tank;

a pump disposed within the outer casing, the pump in fluid communication with the water tank and the ice maker to flow water from the water tank to the ice maker;

at least one drain tube attached to the outer casing, the at least one drain tube in fluid communication with the water tank, each drain tube defining an exit point, each drain tube having a cleaning position and a resting position, wherein the exit point is located vertically below the ice maker at the cleaning position;

an ice bin located proximal to the ice maker to permit ice formed in the ice maker to be directed to the ice bin;

a float sensor mounted in fluid communication with the ice bin; and a controller in operative communication with the pump and the ice maker, the controller configured to initiate a cleaning operation comprising:

receiving a cleaning indication, wherein receiving the cleaning indication comprises receiving a sensor signal from the float sensor indicating that a predetermined fluid level of cleaning solution has been reached for confirming a presence of the cleaning solution, and receiving an indication that the at least one drain tube is in the cleaning position;

initiating a cleaning cycle in response to receiving the cleaning indication, the cleaning cycle comprising pumping a volume of cleaning solution through the ice maker and directing the volume of cleaning solution through the at least one drain tube.

2. The household appliance of claim 1, wherein the cleaning operation further comprises:

confirming ice is absent from the household appliance prior to initiating a cleaning cycle;

directing the at least one drain tube to the cleaning position; and directing an addition of cleaning solution to the household appliance.

3. The household appliance of claim 2, wherein the household appliance further comprises a cleaning solution tank disposed within the outer casing, in fluid communication with the pump, and configured to house a volume of cleaning fluid, wherein confirming a presence of the cleaning solution in the household appliance comprises receiving a level signal from a level sensor attached to the cleaning solution tank.

4. The household appliance of claim 2, wherein the heater is in thermal communication with the ice bin, wherein the cleaning operation further comprises activating the heater prior to confirming ice is absent from the household appliance prior to pumping cleaning solution through the ice maker, and wherein confirming ice is absent from the household appliance prior to pumping cleaning solution through the ice maker further comprises confirming ice is absent from the ice bin.

5. The household appliance of claim 1, wherein the cleaning operation further comprises determining completion of directing the volume of cleaning solution through the at least one drain tube; and initiating at least one rinsing cycle in response to determining completion of directing the volume of cleaning solution through the at least one drain tube, each rinsing cycle comprising pumping a volume of water from the water tank through the ice maker and directing the volume of water through the at least one drain tube.

6. The household appliance of claim 5, wherein the step of initiating the at least one rinse cycle further comprises initiating at least two pre-defined rinse cycles.

7. The household appliance of claim 1, wherein the cleaning operation further comprises receiving a user input selection defining a number of rinse cycles defining a number of rinse cycles to complete in response to receiving a user input selection defining the number of rinse cycles;

determining completion of directing the volume of cleaning solution through the at least one drain tube; and initiating the defined number of rinse cycles in response to determining completion of directing the volume of cleaning solution through the at least one drain tube, each rinsing cycle comprising pumping a volume of water from the water tank through the ice maker and directing the volume of water through the at least one drain tube.

8. The household appliance of claim 1, wherein the cleaning operation further comprises:

determining completion of the cleaning cycle; and directing the at least one drain tube to the resting position in response to determining completion of the cleaning cycle.

9. The household appliance of claim 1, the household appliance further comprising a water reservoir disposed within the outer casing and in direct fluid communication with the ice maker and the pump, the water reservoir configured to house fluid motivated by the pump to the ice maker, wherein pumping a volume of cleaning solution through the ice maker further comprises pumping a volume of cleaning solution to fill the water reservoir and the ice maker;

receiving a full tank indication indicating that a fluid level in the water reservoir has reached a full tank level; and wherein directing the volume of cleaning solution through the at least one drain tube further comprises directing the volume of cleaning solution through the at least one drain tube in response to receiving the full tank indication.

10. The household appliance of claim 9, wherein the ice maker comprises an auger, an auger casing, and a refrigeration system, the auger rotatably mounted within the auger casing to push water through the auger casing, the auger casing in fluid communication with the water reservoir and in thermal communication with the refrigeration system.

11. The household appliance of claim 1, the household appliance further comprising a meltwater tank in fluid communication with the ice bin and the pump, wherein the cleaning operation further comprises directing an addition of cleaning solution to the ice bin; and mixing a volume of cleaning solution with a volume of water in the meltwater tank to form a mixed cleaning solution, wherein the cleaning cycle comprising pumping a volume of cleaning solution through the ice maker further comprises pumping the mixed cleaning solution from the meltwater tank through the ice maker.

12. The household appliance of claim 1, wherein the at least one drain tube further comprises two drain tubes, a first drain tube connected to the pump and a second drain tube connected to a water reservoir of the ice maker; and the first drain tube having a first exit point and the second drain tube having a second exit point, and both the first and second exit points disposed outside the outer casing and further, when the first and second drain tubes are in the cleaning position, the first and second exit points are located in a position vertically below the household appliance.

13. The household appliance of claim 1, wherein receiving the cleaning indication further comprises receiving a cleaning preparation indication that the ice bin has no ice.

14. The household appliance of claim 13, wherein pumping a volume of cleaning solution through the ice maker further comprises pumping a volume of cleaning solution from the ice bin through the ice maker.

15. The household appliance of claim 1, the household appliance further comprising:

a water reservoir in fluid communication with the ice maker and the pump, a top portion of the water reservoir located vertically at or above a top portion of the ice maker;

a drain valve in fluid communication with the pump and the at least one drain tube and configured to allow fluid to flow out of the at least one drain tube when the drain valve is open;

a liquid sensor mounted to the water reservoir to detect a predetermined liquid volume therein, wherein pumping the volume of cleaning solution through the ice maker comprises pumping a volume of cleaning solution and water through the pump and into the water reservoir, receiving a volume signal from the liquid sensor to indicate a presence of the predetermined liquid volume within the water reservoir, and directing the drain valve to open in response to receiving the volume signal to allow the volume of cleaning solution and water to flow out of the household appliance through the at least one drain tube.

16. A method of cleaning a household appliance comprising an ice bin located proximal to an ice maker to permit ice formed in the ice maker to be directed to the ice bin and a float sensor mounted in fluid communication with the ice bin, the method including the steps of:

receiving a cleaning indication, wherein receiving the cleaning indication comprises receiving a sensor signal from the float sensor indicating that a predetermined fluid level of cleaning solution has been reached for confirming a presence of the cleaning solution, and receiving an indication that at least one drain tube is in the cleaning position;

initiating a cleaning cycle in response to receiving the cleaning indication, the cleaning cycle comprising pumping a volume of cleaning solution through an ice maker;

determining completion of the cleaning cycle; and directing the volume of cleaning solution through at least one drain tube by opening a drain valve in response to determining completion of the cleaning cycle, wherein the drain valve is in fluid communication with the at least one drain tube, and wherein the at least one drain tube comprises a cleaning position for use during the cleaning cycle.

17. The method of claim 16, wherein the cleaning cycle further comprises:

confirming ice is absent from the household appliance prior to initiating a cleaning cycle;

directing the at least one drain tube to the cleaning position; and directing addition of cleaning solution to the household appliance.

18. The method of claim 16, wherein the ice maker comprises an auger, an auger casing, a water reservoir and a refrigeration system, the auger rotatably mounted within the auger casing to push water through the auger casing, the auger casing in fluid communication with the water reservoir and in thermal communication with the refrigeration system, and wherein the cleaning cycle further comprises pumping a volume of cleaning solution through the water reservoir and the auger casing.

* * * * *